(12) United States Patent
Morohoshi et al.

(10) Patent No.: US 8,118,419 B2
(45) Date of Patent: Feb. 21, 2012

(54) INK JET RECORDING METHOD, RECORDING DEVICE, INK/RECORDING MEDIUM SET, RECORDING MATTER

(75) Inventors: Naoya Morohoshi, Shizuoka (JP); Masayuki Koyano, Kanagawa (JP); Akihiko Gotoh, Kanagawa (JP); Kiyofumi Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1430 days.

(21) Appl. No.: 10/490,166

(22) PCT Filed: Sep. 20, 2002

(86) PCT No.: PCT/JP02/09659
§ 371 (c)(1),
(2), (4) Date: Nov. 20, 2007

(87) PCT Pub. No.: WO03/026899
PCT Pub. Date: Apr. 3, 2003

(65) Prior Publication Data
US 2008/0273045 A1 Nov. 6, 2008

(30) Foreign Application Priority Data

Sep. 20, 2001 (JP) .................................. 2001-286279
Sep. 20, 2001 (JP) .................................. 2001-286306
Jan. 18, 2002 (JP) .................................. 2002-10468

(51) Int. Cl.
*G01D 11/00* (2006.01)
(52) U.S. Cl. ........ 347/100; 347/95; 428/32.34; 523/160
(58) Field of Classification Search ............. 347/95–101, 347/105; 523/160; 428/32.1, 195, 32.34, 428/32.37; 106/31.13, 31.27, 31.6
See application file for complete search history.

(56) References Cited

U.S. PATENT DOCUMENTS

| 4,478,910 A | 10/1984 | Oshima et al. |
| 4,647,310 A | 3/1987 | Shimada et al. |

(Continued)

FOREIGN PATENT DOCUMENTS

JP 02055184 2/1990

(Continued)

OTHER PUBLICATIONS

Japanese official action.

(Continued)

*Primary Examiner* — Matthew Luu
*Assistant Examiner* — Rut Patel
(74) *Attorney, Agent, or Firm* — Cooper & Dunham LLP

(57) ABSTRACT

An ink-jet recording process which conducts recording by imparting ink onto the surface of a recording medium according to recording information, where the recording medium has a base material and a porous ink receiving layer thereon containing inorganic particles having a BET specific surface area of at least 150 $m^2/g$, and the ink contains a polymer emulsion having a water-insoluble or hardly-soluble colorant contained in polymer fine particles and at least one wetting agent, 8-11 C polyol or glycol ether, anionic or nonionic surfactant, water-soluble organic solvent, and water; and has a surface tension of 40 mN/m or less at 25° C. This process can provide high-grade images excellent in ink absorbing and fixing properties and satisfactory in color tone, produce images excellent in image fastness such as water resistance and light resistance, and implement ink-jet recording excellent in storage stability and discharge stability and free from head clogging at printing.

26 Claims, 2 Drawing Sheets

U.S. PATENT DOCUMENTS

| | | | |
|---|---|---|---|
| 4,711,668 A | 12/1987 | Shimada et al. | |
| 4,728,556 A | 3/1988 | Igawa et al. | |
| 4,733,247 A | 3/1988 | Arai et al. | |
| 4,793,860 A | 12/1988 | Murakami et al. | |
| 4,985,077 A | 1/1991 | Ise et al. | |
| 4,985,397 A | 1/1991 | Uemura et al. | |
| 5,106,816 A | 4/1992 | Morohoshi et al. | |
| 5,144,334 A | 9/1992 | Suzuki et al. | |
| 5,175,568 A | 12/1992 | Oyamaguchi et al. | |
| 5,204,207 A | 4/1993 | Yamashita et al. | |
| 5,286,706 A | 2/1994 | Mochizuki et al. | |
| 5,302,575 A | 4/1994 | Nogawa et al. | |
| 5,314,861 A | 5/1994 | Morohoshi et al. | |
| 5,400,065 A | 3/1995 | Tomono et al. | |
| 5,431,720 A | 7/1995 | Nagai et al. | |
| 5,446,082 A | 8/1995 | Asai et al. | |
| 5,460,909 A | 10/1995 | Shoshi et al. | |
| 5,462,592 A | 10/1995 | Murakami et al. | |
| 5,472,931 A | 12/1995 | Morohoshi et al. | |
| 5,514,208 A | 5/1996 | Nagai et al. | |
| 5,578,405 A | 11/1996 | Ikegami et al. | |
| 5,618,935 A | 4/1997 | Shoshi et al. | |
| 5,619,241 A | 4/1997 | Hosoi et al. | |
| 5,622,550 A | 4/1997 | Konishi et al. | |
| 5,736,286 A | 4/1998 | Kaneko et al. | |
| 5,769,957 A | 6/1998 | Murakami et al. | |
| 5,810,915 A | 9/1998 | Nagai et al. | |
| 5,851,717 A | 12/1998 | Tsubuko et al. | |
| 5,877,235 A | 3/1999 | Sakuma et al. | |
| 5,879,439 A | 3/1999 | Nagai et al. | |
| 5,882,390 A | 3/1999 | Nagai et al. | |
| 5,888,625 A * | 3/1999 | Kobayashi et al. | 428/32.11 |
| 5,952,048 A | 9/1999 | Tsubuko et al. | |
| 5,954,866 A * | 9/1999 | Ohta et al. | 106/31.89 |
| 5,955,185 A | 9/1999 | Yoshino et al. | |
| 5,955,515 A * | 9/1999 | Kimura et al. | 523/161 |
| 5,972,082 A | 10/1999 | Koyano et al. | |
| 5,993,524 A | 11/1999 | Nagai et al. | |
| 6,020,103 A | 2/2000 | Tsubuko et al. | |
| 6,120,589 A | 9/2000 | Bannai et al. | |
| 6,231,652 B1 | 5/2001 | Koyano et al. | |
| 6,261,349 B1 | 7/2001 | Nagai et al. | |
| 6,488,753 B1 | 12/2002 | Ito et al. | |
| 6,495,242 B1 * | 12/2002 | Tsuchiya et al. | 428/32.24 |
| 6,578,958 B2 | 6/2003 | Gotoh et al. | |
| 6,613,136 B1 | 9/2003 | Arita et al. | |
| 6,637,875 B2 | 10/2003 | Kaneko et al. | |
| 6,668,148 B2 | 12/2003 | Hirano et al. | |
| 6,688,737 B2 | 2/2004 | Nagai et al. | |
| 6,736,887 B1 | 5/2004 | Tsutsumi et al. | |
| 6,830,790 B1 | 12/2004 | Misuda et al. | |
| 2001/0036979 A1 * | 11/2001 | Yamanouchi et al. | 523/161 |
| 2002/0083866 A1 | 7/2002 | Arita et al. | |
| 2002/0096085 A1 | 7/2002 | Gotoh et al. | |
| 2002/0135655 A1 | 9/2002 | Ameyama et al. | |
| 2003/0010252 A1 | 1/2003 | Arita et al. | |
| 2003/0064206 A1 | 4/2003 | Koyano et al. | |
| 2003/0079647 A1 | 5/2003 | Kaneko et al. | |
| 2003/0107632 A1 | 6/2003 | Arita et al. | |
| 2004/0096598 A1 * | 5/2004 | Kasamatsu et al. | 428/32.1 |

FOREIGN PATENT DOCUMENTS

| | | |
|---|---|---|
| JP | 7-2426 | 1/1995 |
| JP | 9-66664 | 3/1997 |
| JP | 9-183932 | 7/1997 |
| JP | 10-71764 | 3/1998 |
| JP | 11-348413 | 12/1999 |
| JP | 2000026779 | 1/2000 |
| JP | 2000-53897 | 2/2000 |
| JP | 2000-141883 | 5/2000 |
| JP | 2000-158808 | 6/2000 |
| JP | 2000-190629 | 7/2000 |
| JP | 2000-239583 | 9/2000 |
| JP | 2000-319572 | 11/2000 |
| JP | 2001-10212 | 1/2001 |
| JP | 2001-55530 | 2/2001 |
| JP | 2001-89686 | 4/2001 |
| JP | 2001-138628 | 5/2001 |
| JP | 2001-139849 | 5/2001 |
| JP | 2001-246830 | 9/2001 |
| JP | 2001-246836 | 9/2001 |
| JP | 2001-247788 | 9/2001 |
| JP | 2002088286 | 3/2002 |
| WO | 02102906 | 12/2002 |
| WO | 03027197 | 4/2003 |

OTHER PUBLICATIONS

Mar. 24, 2011 Japanese official action in connection with a counterpart Japanese patent application.

\* cited by examiner

INK JET RECORDING METHOD, RECORDING DEVICE, INK/RECORDING MEDIUM SET, RECORDING MATTER

This application is a continuation under 35 U.S.C. 365(c) of International Application No. PCT/JP02/09659, designating the U.S. and filed Sep. 20, 2002.

BACKGROUND

1. Technical Field

This disclosure relates to an ink-jet recording process, a recording apparatus, an ink-media (recording medium) set and a record using an ink containing, instead of a conventional pigment, a polymer emulsion containing polymer line particles having a water-insoluble or hardly-soluble colorant. More specifically, it relates to an ink-jet recording process, a recording apparatus, an ink-medium (recording medium) set and a record which can produce a high-quality image with good color tone, satisfactorily absorb ink, he satisfactorily fixed, produce an image with outstanding fastness such as water resistance and light resistance and implement ink jet recording excellent in storage stability and discharge stability without head clogging in printing.

2. Description of the Related Art

Ink-jet printers exhibit low noise and low running cost and have thereby been widely employed. Color printers that can print not only ink-jet-dedicated recording media but also plain paper are now placed on the market. However, these printers cannot significantly satisfy all the requirements typically in color reproducibility, durability, light resistance and drying property of images, bleed in characters (feathering), color boundary bleed (color bleed), printability on both sides of medium (two-side printability) and discharge stability. An ink to be used is selected according to precedential properties depending on the purpose. Particularly, printers that implement high-speed printing on plain paper cannot significantly satisfy all these requirements, and a variety of proposals have been made on inks and recording media, respectively. For example, Japanese Patent Application Laid-Open (JP-A) No. 09-157559 and No. 09-132740 each disclose the use of a pigment ink having higher light resistance than a dye ink. JP-A No. 55-5183 and No. 56-148585 each disclose a receiving layer comprising a porous inorganic pigment arranged on a substrate of a recording medium for the purpose of improving ink absorption.

A pigment ink is generally anionically dispersed. Noting this, a process of compounding a cationic component in the ink-receiving layer to thereby aggregate the ink has been proposed to fix an image according to the above system. In this connection, a large amount of a cationic component must be used to fix a dye in a dye ink. In contrast, a pigment ink will excessively aggregate and distribute unevenly on the surface, thus leading to a decreased recording density, when such a cationic component is used in excess. The pigment ink thereby often fails to produce an excellent record on conventional recording media for dye inks. A pigment has a much higher molecular weight than a dye and requires an image-fixing mechanism such as control of bleed apparently different from that of a dye having a low molecular weight. In ink-jet recording process using a pigment ink, a droplet of the ink is discharged to a receiving layer to form an image, as in a dye ink. In such an ink-jet recording system, print quality is largely affected by the difference in ink absorptivity. Upon recording using a dye ink, the ink absorptivity increases but the print density significantly decreases with an increasing amount of the dye ink for forming a surface layer on a recording paper, since the pigment component is absorbed into the inside of the recording medium. In contrast, when the amount of a pigment ink is decreased to allow the pigment component to remain on the surface, bleed becomes worse, the ink solvent is not sufficiently absorbed by the receiving layer and the pigment particles move with the solvent. Thus, the pigment particles distribute unevenly on the receiving layer surface, a white background of the receiving layer is exposed from the printed portion and the print density often decreases. These two techniques require different properties on recording matters, and a variety of proposals have been made.

Referring to inks, inks for use in ink-jet recording generally mainly comprise water and further comprise a colorant and a wetting agent such as glycerol for preventing clogging. Dyes are used as the colorant for their excellent color development and stability. However, images produced by using such dye inks have insufficient light resistance and water resistance. The water resistance is improved to some extent by using improved ink-jet dedicated recording media having an ink-absorbing layer but is still insufficient on plain paper.

As a possible solution to these problems, pigment inks using a pigment such as an organic pigment or carbon black as the colorant instead of a dye have been developed. Such a pigment is insoluble in water and is used as an aqueous ink prepared by mixing and dispersing the pigment and a dispersing agent in water to thereby stably disperse the components in water. The use of a pigment can improve the water resistance and light resistance but does not satisfy all the other properties simultaneously, as in the above case. In particular, the pigment ink cannot significantly produce an image with high density and high color development when the ink is printed typically on plain paper at high speed, or does not sufficiently satisfy the requirements in character bleed, color boundary bleed and two-side printability.

In ink-jet recording, an ink must be stably discharged as droplets from fine nozzles of an ink-jet recording head and must not be dried and solidified in orifices of the ink-jet recording head. However, when the ink containing the dispersing agent is used in ink-jet recording, a resin or another component constituting the dispersing agent is loaded to the orifices and may not be dissolved again, thus leading to clogging or discharge failure of the ink. After a long downtime of printing, the nozzles and other parts may be often clogged and the ink with an increased viscosity deposits on maintenance mechanisms such as nozzle caps or suction tubes to thereby deteriorate the functions thereof. When printing is sustained temporarily or sustained in a nozzle corresponding to a blank in a document or image, the direction of the ink droplets ejection is disturbed and thereby print failures (failures in intermittent discharge) often occur.

An aqueous pigment ink containing a dispersing agent is generally viscous, thereby shows high resistance in a pathway to the tip of a nozzle and is discharged unstably, thus failing to produce a record smoothly.

For solving these problems, JP-A No. 2000-212486 discloses an ink and a set thereof, comprising a pigment, a water-soluble dispersing agent, a specific penetrating agent and polyhydric alcohol alkyl ether derivative, in which the types and concentrations of the pigment and the resin constituting the dispersing agent are specified in combination.

The ink disclosed herein is very highly penetrable, thereby can be dried sufficiently and discharged stably even in high-speed printing, but shows inferior image density and color reproducibility on plain paper to a dye ink. The character bleed, color boundary bleed and two-side printability are improved as compared with images formed by conventional ink-jet recording techniques but are inferior to images recorded typically by electrophotography generally used in the market in printing on plain paper.

As a possible solution to improve the image durability, an ink containing a colorant-including resin dispersion has been proposed. The dispersion comprises a water-insoluble but dispersible resin including a colorant. However, this ink does not produce an image with a sufficient density when carbon black is used as the colorant, and shows inferior image density and color reproducibility on plain paper to a dye ink when a color organic pigment is used as the colorant in a conventional ink formulation. In addition, an ink set comprising the colorant-including resin dispersions as the black ink and color inks shows some color boundary bleed between the black and yellow colors.

Self-dispersible pigment inks which can be dispersed stably without using a dispersing agent are known as another dispersing technique. As black pigment inks, "self-dispersible carbon blacks" capable of stably dispersing without using a dispersing agent have been developed, as disclosed in JP-A No. 05-186704, No. 08-3498 and No. 10-140064. These self-dispersing carbon blacks each have a hydrophilic group introduced to the surface of carbon. Color pigments for use in color pigment inks capable of stably dispersing without using a dispersing agent have been developed, as disclosed in JP-A No. 2000-513396. These color pigments are modified with a surface modifier containing an ionic group or ionizable group.

The combination use of these self-dispersible pigment inks, however, leads to a color image with low color saturation on recording media and low scratch resistance on glossy paper and other dedicated recording media. When a resin emulsion is added to improve the scratch resistance, the ink disperses less stably and is therefore discharged less stably.

Aforementioned JP-A No. 10-140064 also discloses an ink set of a black ink and color inks, in which the black ink contains a self-dispersible carbon black and each of the color inks contains a colorant having a polarity opposite to the colorant of the black ink.

JP-A No. 2000-191972 discloses an ink set having improved bleed resistance and comprising a self-dispersible carbon black ink and color inks each containing ions with polarity opposite to that of ions in the self-dispersible carbon black ink. Prints produced by using these ink sets show improved color boundary bleed but are still insufficient in other properties than the color boundary bleed.

Improvements of the printability of recording media have been also made on ink-jet dedicated recording media of coated paper type comprising a substrate and a coating layer arranged on the substrate.

For example, No. 57-82085 and No. 57-135190 each disclose ink-jet recording sheets which contain a plastic pigment and have been subjected to heating and calendering as in JP-A No. 06-79967. These publications describe that the ink-jet recording sheet using a plastic pigment has satisfactory ink absorptivity and gloss but shows decreased color reproducibility and color density and thus fails to produce sharp images, since the sheet must contain a large quantity of voids between particles of the plastic pigment for keeping its ink absorptivity and the plastic pigment thereby has a high refractive index. They also describe that, when the ink-jet recording sheet is subjected to calendering or super-calendering to impart gloss thereto, the voids in the coating layer decrease with an increasing gloss, thus inviting slow absorption of the ink and ink flood due to insufficient absorptivity, and that the sheet absorbs ink more slowly in a less amount than an ink-absorbing layer comprising pigment fine particles such as silica.

As an ink receiving layer that rapidly absorbs inks without bleeding, these publications describe a layer comprising a binder and an inorganic pigment such as silica particles or alumina particles dispersed in the binder. An ink-jet recording material having this layer as the ink-receiving layer is referred to as a void-absorption or pore-absorption type recording material. In this material, the ink enters the voids among the inorganic pigment particles occupying about 90% of the layer to produce a print. The layer of the silica particles or alumina particles is often white or opaque white as a background.

Examples of ink-jet recording media having an ink-receiving layer mainly comprising a water-soluble resin can be found in JP-A No. 11-342669 as an ink-jet recording medium containing hydroxypropyl methylcellulose and having an ink-receiving layer containing a homopolymer of N-vinylpyrrolidone or a copolymer of N-vinylpyrrolidone and another polymerizable monomer; JP-A No. 2000-108508 as an ink-jet recording sheet comprising a methoxy-containing water-soluble cellulose derivative and water-soluble cationic resin; and JP-A No. 10-329405 as an ink-jet recording sheet containing a hydrophilic polymer resin and a specific anionic fluorine-containing surfactant.

Certain ink-jet recording sheets having an ink-receiving layer mainly comprising an inorganic pigment and binder can be found in JP-A No. 10-119417 as an ink-jet recording sheet comprising a substrate sheet, an ink-permeating layer mainly comprising an inorganic filler and an ink-swelling layer mainly comprising a water-soluble resin, both arranged on the substrate sheet; and JP-A No. 10-329417 as an ink-jet recording film comprising (A) an ink-receiving layer containing a water-soluble resin, a surface-roughening agent and a crosslinking agent, and (B) a layer containing a dot shape controlling agent, in which at least two synthetic silica having different oil absorption are used as the surface-roughening agent, and the amounts of these surface-roughening agents are controlled to thereby set the number of standard wiping of the recording layer at 20 to 100 and the ink-fixing time at 5 minutes or less.

JP-A No. 11-99739 describes an ink-jet recording sheet having a first ink-receiving layer and a second ink-receiving layer arranged on the first ink-receiving layer, in which the first ink-receiving layer serves to receive and absorb an ink which the second ink-receiving layer does not completely absorb, and contains a resin component which is dissolved in or swelled by the coating composition for the second ink-receiving layer, and the content of the pigment in the second ink-receiving layer is larger than that of the first ink-receiving layer.

JP-A No. 11-245502 describes an ink-jet coating agent containing 15% by weight to 90% by weight of a water-absorbing polyurethane and, in addition, 10% by weight to 80% by weight of a silica mixture on the basis of solid content of the total coating agent, in which the silica mixture comprises 10% by weight to 30% by weight of a silica having an average particle diameter of 6 to 9 μm, 15% by weight to 40% by weight of a light scattering silica having an average particle diameter of 10 to 15 μm, and 15% by weight to 40% by weight of a porous silica having an average particle diameter of 10 to 22 μm. JP-A No. 11-291619 describes an ink-jet recording film having an adhesive layer and an ink-receiving layer sequentially arranged, in which the adhesive layer mainly contains (A) a binder, (B) a film-forming auxiliary and (C) a crosslinking agent, and the ink-receiving layer mainly contains the same binder as the component (A), (D) surface roughening agent, the same crosslinking agent as the component (C), and (E) a catalyst, wherein the weight ratio of the binder to the surface-roughening agent in the ink-receiving layer is from 2:3 to 1:3.

JP-A No. 11-301093 describes an ink-jet recording material having an ink-receiving layer and an ink-solvent-permeating layer arranged on the ink-receiving layer, which ink-solvent-permeating layer allows a solvent to pass therethrough but does not allow a pigment to pass therethrough. JP-A No. 2000-1043 describes a recording material for aqueous ink, formed from a resin composition comprising a polyvinyl acetal resin, a urea-glyoxal-acrylamide polycondensate and/or an epoxy compound, and fine particles. JP-A No. 2000-79752 describes an ink-jet recording medium containing typically a synthetic silica and a cationic resin having a cationic intensity of 1.5 mEq/g or more and 6 mEq/g or less. JP-A No. 2000-79752 and No. 2000-79754 each describe a partially erasable recording sheet having an ink-receiving layer bearing an ink-jet printing pattern formed by a pigment ink which is incompatible with the ink-receiving layer.

JP-A No. 2000-127610 describes an ink-jet recording sheet comprising porous starch particles and a binder resin, which porous starch particles contain inorganic or organic fine particles embedded in their pores. JP-A No. 2000-141876 describes an ink-jet recording sheet mainly comprising a polyvinyl acetal resin and containing a polyvinylpyrrolidone resin, a urea-glyoxal-acrylamide polycondensate and/or epoxy compound, and fine particles. JP-A No. 2000-190622 describes an ink-jet recording material having an ink-receiving layer containing an inorganic pigment, a water-insoluble resin and a metal salt having an ion valency of 2 or more. JP-A No. 2000-238420 describes an ink-jet recording sheet having a recording layer, in which the recording layer mainly contains a synthetic silica having an average particle diameter of 3 to 15 μm as a pigment and a poly(vinyl alcohol) having a degree of saponification of 96% by mole or more as a binder, wherein the binder is contained in an amount of 10 to 50 parts by weight to 100 parts by weight of the pigment, and the recording layer further contains 1 to 40 parts by weight of a quaternary ammonium salt polymer to 100 parts by weight of the pigment, and 20 to 100 parts by weight of a curing agent to 100 parts by weight of the binder.

JP-A No. 2000-247014 describes a recording material for aqueous ink, which mainly comprises a polyvinyl acetal resin prepared by treating a poly(vinyl alcohol) with an aromatic aldehyde into an acetal and further comprises a water-soluble acrylic resin, a water-soluble epoxy compound and fine particles of at least one selected from silicic acid, silica, kaolin, clay, alumina, calcium carbonate, zeolite, titanium oxide, talc and spherical polymers. JP-A No. 2000-318298 describes an ink-jet recording sheet having a smoothness of 5 sec or more and 40 sec or less and comprising a resin film, a lower layer containing an amorphous synthetic silica and a water-insoluble resin, and an upper layer containing an amorphous synthetic silica, a water-insoluble resin and a silanol-modified poly(vinyl alcohol).

Regarding an aluminum oxide-containing receiving layer, JP-A No. 06-79967 describes an ink-jet recording sheet comprising a substrate and an ink-receiving layer having one or more layers of an alumina hydrate, in which the ink-receiving layer and the image recorded region after receiving the ink have a 60-degree specular gloss of 25% or more and 20% or more, respectively. The alumina hydrate is a high-molecular-weight alumina generally called as an alumina sol, has satisfactory ink permeability, has a high positive charge and is therefore suitable as image-fixing of a dye in the ink. The alumina sol herein comprises particles preferably in the form of pseudoboehmite and boehmite and more preferably in the form of fiber. However, JP-A No. 11-198520 mentions that an ink-jet recording material using such a boehmite alumina sol has very high surface gloss but has a low pore volume, thereby absorbs less amount of the ink and must be formed as a thick layer, as described typically in JP-A No. 05-24335. As is described above, preferred requirements of recording media vary depending on the types of ink and/or recording conditions and are not always constant.

JP-A No. 2000-37945 describes an ink-jet recording sheet having an ink-receiving layer comprising two types of aluminum oxide fine particles bound by action of a binder, in which the two aluminum oxide fine particles have different particle diameters, and the mainly contains a partially saponified poly(vinyl alcohol) having a degree of polymerization of 1000 or more and a degree of saponification of 80% by mole to 95% by mole. Aforementioned JP-A No. 11-198520 describes an ink-jet recording material as a laminate of a layer of γ or δ aluminum oxide and another layer containing a water-soluble or water-swellable polymer. These recording sheets, however, do not satisfy ink-jet suitability such as ink absorptivity, image density, beading and image-fixing properties (scratch resistance) in ink-jet recording using an "ink containing a polymer emulsion comprising polymer fine particles having a water-insoluble or hardly-soluble colorant" which resembles to but is distinguished from conventional regular pigment inks.

Certain media for use in ink-jet recording are known, which comprise a substrate such as plain paper or an ink-jet-dedicated coated paper, and an ink-receiving layer arranged on the substrate and comprising a pigment such as amorphous silica and a water-soluble binder such as a poly(vinyl alcohol). As the substrate for such media, paper is conventionally used, and the paper substrate plays a role as a layer for absorbing the ink solvent. With an increasing demand on image quality similar to that of silver halide photographs and an increasing demand to provide glossy texture of the surface of media, a non-absorbable resin-coated paper similar to silver halide photographic paper is used as the substrate. The ink absorptivity and surface smoothness of an ink-receiving layer therefore become important. Improvements have been made to incorporate a silica prepared by the gas phase process or alumina fine particles into an ink-receiving layer to thereby increase the surface smoothness and porosity of the ink-receiving layer.

For example, JP-A No. 06-79967 discloses a cast glossy paper having an ink-receiving layer containing an alumina hydrate as the outermost layer. However, this paper shows a large amount of cracking on the outermost layer and invites the ink to bleed in printing or the substrate to absorb the solvent in the ink, leading to curling and cockling. JP-A No. 2000-351267 discloses a recording medium and process having satisfactory absorptivity for a pigment ink and good image-fixing properties for the purpose of increasing not only initial image quality but also image fastness to those of silver halide photographs. However, when this technique is applied to a pigment ink containing no polymer in a dispersing agent, such as a self-dispersible pigment or surfactant-dispersing pigment, it invites a lower gloss of images than the surface of the medium or insufficient image-fixing properties such as scratch resistance. Further improvements have therefore been demanded.

BRIEF SUMMARY

In an aspect of this disclosure, there is provided an ink jet recoding process, recording apparatus, ink-medium (recording medium) Set and record, which exhibit satisfactory discharge stability and storage stability and can produce (1) a good color tone, (2) a high image density, (3) a sharply recorded image without blurring or bleed in peripheries of characters and image, (4) less bleed at the boundary between different colors (color bleed), (5) an image with less unevenness, and (6) an image with good fastness such as water resistance, light resistance and scratch resistance. In another aspect of this disclosure, there is provided an ink-medium set including a color pigment ink and a dedicated medium for ink-jet recording, and to provide a suitable recording process using the ink and medium. A In another aspect of this disclosure, there is provided an ink-medium set and image recording process which can produce a glossy and sharp image having satisfactory physical image-fixing properties such as scratch resistance and having excellent fastness such as water resistance and light resistance.

DETAILED DESCRIPTION OF THE INVENTION

Figure 1:
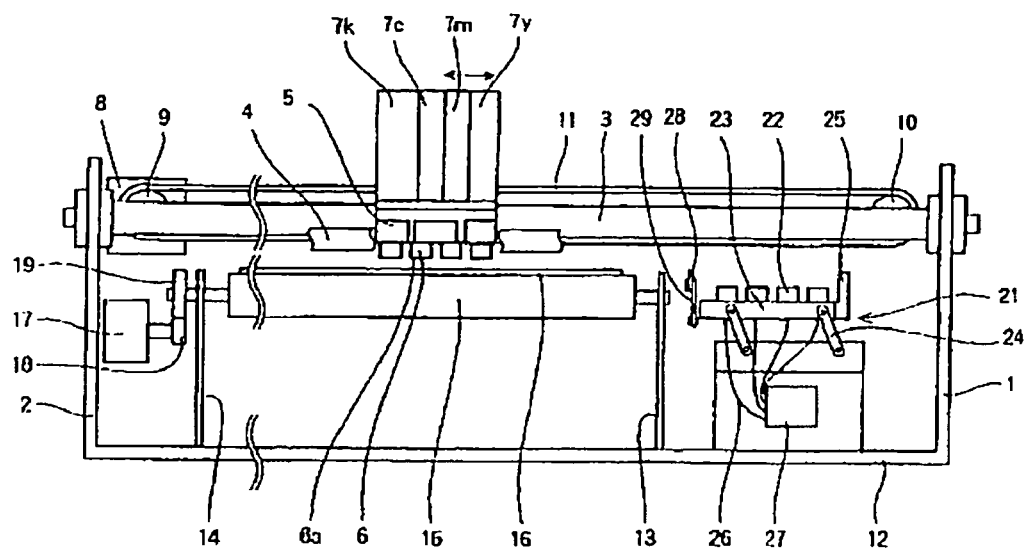
FIG. 1 is a schematic elevational view of a configuration of a serial ink-jet recording apparatus having an ink cartridge housing a recording liquid according to the present invention.

After intensive investigations to achieve the above objects, the present inventors have found that the above objects are hardly achieved by the single use of the improved "ink containing a polymer emulsion comprising polymer fine particles having a water-insoluble or hardly-soluble colorant" alone. They also have found that the above objects can be achieved by applying an ink according to recording information to the surface of a porous layer of a specific recording medium containing one or more porous layers containing inorganic particles arranged on a substrate, which ink contains a polymer emulsion comprising polymer fine particles having a water-insoluble or hardly-soluble colorant in a relatively high concentration and has a relatively high viscosity but a relatively low surface tension. In particular, the above configuration can produce a uniform image having good absorptivity of the polymer-emulsion-containing ink and having improved scratch resistance. The present invention has been accomplished based on these findings.

They also have found that a photographic image with good image-fixing properties and fastness such as light resistance and water resistance can be produced by using an ink-medium set containing an ink and a medium, which ink is prepared from a specific wetting agent, penetrating agent and water-soluble organic solvent using an emulsion comprising a colorant-having polymer fine particles, and which medium comprises a substrate and a porous ink-receiving layer arranged on or above the substrate and containing porous particles and a binder, and which ink-receiving layer has a specific gloss on its surface. The present invention has also been accomplished based on these findings.

Specifically, the above objects can be achieved by the present invention as (1) an ink-jet recording process comprising the step of applying an ink to the surface of a recording medium according to recording information, wherein the recording medium comprises a substrate and at least one porous ink-receiving layer arranged on or above the substrate, the ink-receiving layer comprising inorganic particles having a BET specific surface area of 150 m$^2$/g or more, and wherein the ink comprises a polymer emulsion containing polymer fine particles having a water-insoluble or hardly-soluble colorant, at least one wetting agent, a polyol or glycol ether having 8 to 11 carbon atoms, an anionic or nonionic surfactant, a water-soluble organic solvent and water, wherein the ink has a surface tension of 40 mN/m or less at 25° C.;

(2) an ink-jet recording process according to the section (1), wherein the ink has a viscosity of 5 mPa·sec or more at 25° C.;

(3) an ink-jet recording process according to one of the sections (1) and (2), wherein the ink comprises, in terms of solid content, 8% by weight to 20% by weight of the polymer emulsion containing the colorant;

(4) an ink-jet recording process according to any one of the sections a(1) to (3), wherein the polymer emulsion containing the colorant in the ink has an average particle diameter of 0.16 μm or less;

(5) an ink-jet recording process according to any one of the sections (1) to (4), wherein the maximum amount of the ink applied to the recording medium is 40 g/m$^2$ or less, and an image formed by the ink on the recording medium has a 60-degree gloss of 10 to 80;

(6) an ink-jet recording process according to any one of the sections (1) to (5), wherein the wetting agent is selected from the group consisting of glycerol, 1,3-butanediol, triethylene glycol, 1,6-hexanediol, propylene glycol, 1,5-pentanediol, diethylene glycol, dipropylene glycol, trimethylolpropane and trimethylolethane;

(7) an ink-jet recording process according to any one of the sections (1) to (6), wherein the polymer constituting the polymer emulsion in the ink is one of a vinyl polymer and a polyester polymer;

(8) an ink-jet recording process according to any one of the sections (1) to (7), wherein the ink contains the wetting agent in an amount of from 10% by weight to 50% by weight;

(9) an ink-jet recording process according to any one of the sections (1) to (8), wherein the weight ratio [(wetting agent)/(solid content in emulsion)] of the wetting agent to the solid content of the polymer emulsion in the ink is from 2 to 5;

(10) an ink-jet recording process according to any one of the sections (1) to (9), wherein the ink has a viscosity of 8 to 20 mP sec at 25° C.;

(11) an ink-jet recording process according to any one of the sections (1) to (10), wherein the polyol or glycol ether having 8 to 11 carbon atoms is 2-ethyl-1,3-hexanediol; and

(12) an ink-jet recording process according to any one of the sections (1) to (10), wherein the polyol or glycol ether having 8 to 11 carbon atoms is 2,2,4-trimethyl-1,3-pentanediol.

The objects can also be achieved by the present invention as

(13) an ink-jet recording process according to the section (1), wherein the inorganic particles in the porous layer have a number-average primary particle diameter of one nanometer to thirty and several nanometers and contain particles having a primary particle diameter of less than 1 nm in a content of less than 10% by number and particles having a primary particle diameter of more than 30 nm in a content of less than 5% by number;

(14) an ink-jet recording process according to one of the sections (1) and (13), wherein the porous layer comprises a binder resin for binding the inorganic particles in an amount of 5% by weight to 50% by weight to the amount of the inorganic particles;

(15) an ink-jet recording process according to any one of the sections (1), (13) and (14), wherein the porous layer has a thickness of 5 µm to 50 µm;

(16) an ink-jet recording process according to any one of the sections (1), (13), (14) and (15), wherein the particles in the porous layer comprise one of silica and alumina;

(17) an ink-jet recording process according to any one of the sections (1), (13), (14), (15) and (16), wherein the porous layer comprises a porous layer of an alumina hydrate, and another porous layer containing the inorganic particles arranged on or above the porous layer of alumina hydrate;

(18) an ink-jet recording process according to any one of the sections (1), (13), (14), (15), (16) and (17), wherein the uppermost porous layer of the recording medium has a peak in a pore radius distribution curve at 20 nm or less; and

(19) an ink-jet recording process according to any one of the sections (1), (13), (14), (15), (16), (17) and (18), wherein the uppermost porous layer of the recording medium has a Beck smoothness of 300 seconds or more.

The above objects can also be achieved by the present invention as (20) an ink-jet recording process comprising the step of ejecting the ink of the ink-recording medium set used in the recording process of any one of the sections (1) to (19) according to a recording signal to thereby produce an image on the recording medium of the ink-recording medium set;

(21) an ink-jet recording process according to any one of the sections (1) to (20), further comprising applying heat energy to the ink to thereby discharge the ink; and

(22) an ink-jet recording process according to any one of the sections (1) to (20), further comprising applying mechanical energy to the ink to thereby discharge the ink.

The above objects can also be achieved by the present invention as (23) an ink-jet recording process according to any one of the sections (1) to (22), wherein the ink comprises inks of plural colors including at least cyan, magenta and yellow, and wherein a full-color image is formed on the recording medium using the ink;

(24) an ink-jet recording process according to any one of the sections (1) to (23), wherein the ink comprises inks of plural colors including at least cyan, magenta and yellow, and wherein an achromatic image is formed without using a black ink; and

(25) an ink-jet recording process according to one of the sections (23) and (24) further comprising the steps of ejecting the inks of plural colors including at least cyan, magenta and yellow according to a recording signal, and mixing at least part of the color inks on the recording medium, wherein the color inks are applied in increasing order of lightness to form an image in a mixed color portion.

The above objects can also be achieved by the present invention as (26) an ink-jet recording apparatus comprising an ink container or ink cartridge for ink-jet recording process, and a head or recording unit for discharging an ink as droplets, wherein the ink to be housed in the ink container or ink cartridge is the ink used in the recording process according to any one of the sections (1) to (25).

The above objects can also be achieved by the present invention as (27) an ink-recording medium set, which is for use in the recording process according to any one of the sections (1) to (25).

The above objects can also be achieved by the present invention as (28) a record which is recorded by the recording process according to any one of the sections (1) to (25).

The recording medium for use in the ink-jet recording process of the present invention comprises a substrate and one or more specific porous layers arranged on or above the substrate and containing inorganic particles. Excellent ink absorptivity and high image density are achieved probably because the pore structure of the porous layer of the recording medium matches the physical properties of the ink. Outstanding scratch resistance of recorded images is achieved probably because the vinyl polymer, polyester polymer and polyurethane polymer for use as the polymer for constituting the polymer emulsion of the ink have satisfactory affinity for the porous layer of the recording medium, and they effectively serve as a binder of the colorant.

The substrate of the recording medium for use in the recording process of the present invention is not specifically limited and can be any of various substrates. Preferred examples of the substrate are poly(ethylene terephthalate) and other polyester resins, polycarbonate resins, ETFE, other fluorine-containing resins, and other plastics, as well as plain paper, art paper, coated paper and other paper. In addition, fabrics, glass and metals can be used. These substrates may be subjected to corona discharge or undercoating for the purpose of typically improving the adhesive force with the porous layer. The use of an optically transparent plastic film as the substrate can yield an optically transparent record usable typically as a sheet for overhead projector (OHP). The use of an opaque plastic film containing a white pigment or paper as the substrate can yield a record equivalent to a silver halide photograph.

A paper substrate as the paper substrate preferably has a basis weight of 45 g/cm$^2$ to 150 g/cm$^2$. A resin film substrate as the substrate has a thickness of preferably 10 µm to 500 µm, and more preferably 20 µm to 250 µm. Such a substrate having a thickness less than 10 µm is often deformed, is difficult to handle and generally easily stretches, thus inviting problems in dimensional stability of images. A substrate having a thickness exceeding 500 µm may be too rigid to bend, is thereby difficult to handle and may induce insufficient optical transparency in non-image portions when used in light transmitting applications such as OHP.

The porous ink-receiving layer according to the present invention is formed by using inorganic particles. The inorganic particles can be porous particles having a BET specific surface area of 150 m$^2$/g or more and preferably 250 m$^2$/g or more which are selected from pigments (fillers) such as synthetic amorphous silica, precipitated calcium carbonate light, ground calcium carbonate, kaolin, talc, calcium sulfate, barium sulfate, titanium dioxide, zinc oxide, zinc sulfide, zinc carbonate, satin white, aluminium silicate, diatomaceous earth, calcium silicate, magnesium silicate, aluminum hydroxide, alumina, lithopone, zeolite, hydrated halloysite, magnesium carbonate and magnesium hydroxide. Among them, synthetic amorphous silica fine particles and alumina hydrates are preferred, of which alumina hydrates are typically preferred. Particles having a BET specific surface area less than 150 m$^2$/g cannot achieve sufficient ink absorptivity for the present invention in combination with an appropriate amount of a resin binder.

Accordingly, silica fine particles, alumina fine particles or composite fine particles of silica and alumina are referred as the inorganic particles in the porous layer. To prepare an optically transparent porous layer, alumina, especially pseudoboehmite, is preferred. Pseudoboehmite is an aggregate of alumina hydrates represented by the compositional formula of $Al_2O_3$-$nH_2O$, wherein n is 1 to 1.5.

Such inorganic particles of silica, alumina or silica-alumina composite are fine particles comprising aggregates of ultrafine primary particles. They preferably comprise aggregates of primary particles having a particle diameter of 1 to 30 nm and have a number-average particle diameter of preferably 1 to 20 µm and more preferably 2.0 to 15 µm. Among them, those of synthetic silica or alumina hydrates are preferred. The inorganic fine particles such as synthetic silica and other silica or alumina hydrate preferably have a small particle diameter for an appropriate viscosity of a coating composition to form a porous layer having a smooth surface. However, a layer prepared by using particles having a small particle diameter may often become dense and provides sharp dot reproducibility with less broadening of ink dots, but absorbs the ink at relatively low speed because of small gaps or voids between particles and small pores on their surfaces.

In contrast, a layer prepared by using particles having a large particle diameter can rapidly absorb the ink due to its large gaps between the particles and large pores on their surfaces, but may often induce broadened ink dots and ink bleed, insufficient drying property of ink and low image density. More specifically, if particles have a primary particle diameter exceeding 30 nm, the resulting recording layer may have less smooth surface and more broadened dots. Accordingly, it is preferred in the present invention that the content of particles having a primary particle diameter less than 1 nm is less than 10% by number, and the content of particles having a particle diameter exceeding 30 nm is less than 5% by number.

Among various types of silica, a synthetic silica prepared by a gas phase process and having an average primary particle diameter of 30 nm or less and a BET specific surface area of $250 \, m^2/g$ or more is preferred for high ink absorptivity and gloss. As the alumina, β-alumina and γ-alumina are typically used. Silica particles having a surface treated with an aluminum salt are also preferably used.

In the present invention, a synthetic silica or alumina hydrate having one specific particle diameter can be used alone. In addition, a mixture of silica and an alumina hydrate or a mixture of silica or alumina hydrate having different particle diameters can also be used. The mixture herein should also preferably be so configured that the inorganic particles in the porous layer have a number-average primary particle diameter of one nanometer to thirty and several nanometers (one nanometer or more and less than forty nanometers), the content of particles having a primary particle diameter less than 1 nm is less than 10% by number, and the content of particles having a primary particle diameter exceeding 30 nm is less than 5% by number.

Examples thereof are MIZUKASIL P-802 (specific surface area: 150 to 200 $m^2/g$), MIZUKASIL P-73 (specific surface area: 300 to 350 $m^2/g$), MIZUKASIL P-78D (specific surface area: 300 to 350 $m^2/g$), MIZUKASIL P-87 (specific surface area: 280 to 330 $m^2/g$) and MIZUKASIL P-363 (specific surface area: 280 to 330 $m^2/g$) available from Mizusawa Industrial Chemicals, Ltd.; AEROSIL 200 (primary particle diameter: about 12 nm, secondary particle diameter: 2 to 15 µm, specific surface area: 200±25 $m^2/g$, Nippon Aerosil Co., Ltd.), AEROSIL 200V (primary particle diameter: about 12 nm, secondary particle diameter: 2 to 15 µm, specific surface area: 200±25 $m^2/g$, Nippon Aerosil Co., Ltd.), AEROSIL 200CF (primary particle diameter: about 12 nm, secondary particle diameter: 2 to 15 µm, specific surface area: 200±25 $m^2/g$, Nippon Aerosil Co., Ltd.), AEROSIL 200FAD (primary particle diameter: about 12 nm, secondary particle diameter: 2 to 15 µm, specific surface area: 200±25 $m^2/g$, Nippon Aerosil Co., Ltd.), AEROSIL 300 (primary particle diameter: about 7 nm, secondary particle diameter: 2 to 15 µm, specific surface area 300±30 $m^2/g$, Nippon Aerosil Co., Ltd.), AEROSIL 300CF (primary particle diameter: about 7 nm, secondary particle diameter: 2 to 15 µm, specific surface area: 300±30 $m^2/g$, Nippon Aerosil Co., Ltd.), AEROSIL 974 (primary particle diameter: about 12 nm, secondary particle diameter: 2 to 15 µm, specific surface area 170±20 $m^2/g$, Nippon Aerosil Co., Ltd.), AEROSIL 805 (primary particle diameter: about 12 nm, specific surface area: 150±25 $m^2/g$, a product of Degussa AG), AEROSIL 812 (primary particle diameter: about 7 nm, specific surface area: 260±30 $m^2/g$, a product of Degussa AG), AEROSIL R8125 (primary particle diameter: about 7 mm, specific surface area: 220±25 $m^2/g$, a product of Degussa AG), AEROSIL 600 (primary particle diameter: about 40 nm, specific surface area: 200±50 $m^2/g$, a product of Degussa AG), a product of Degussa AG), AEROSIL MOX 170 (primary particle diameter: about 15 nm, specific surface area: 170±30 $m^2/g$, a product of Degussa AG) and AEROSIL COK 84 (specific surface area: 170±30 $m^2/g$, a product of Degussa AG); SNOW TEX 20 (primary particle diameter: 10 to 20 µm), SNOW TEX 30 (primary particle diameter: 10 to 20 µm), SNOW TEX 40 (primary particle diameter: 10 to 20 nm), SNOW TEX C (primary particle diameter: 10 to 20 µm), SNOWTEX N (primary particle diameter: 10 to 20 nm), SNOW TEX O(primary particle diameter: 10 to 20 nm), SNOW TEX S (primary particle diameter: 8 to 11 nm) and SNOW TEX XS (particle diameter: 4 to 6 mm) from Nissan Chemical Industries, Ltd.; Silica 606 (porous silica, average particle diameter: 10 to 22 µm, Toyo Chemical Co., Ltd.), Nipsil ER (amorphous synthetic silica, average particle diameter: 11.0 µm, a product of Nippon Silica Industrial Co., Ltd.), Nipsil L300 (amorphous synthetic silica, average particle diameter: 7.0 µm, a product of Nippon Silica Industrial Co., Ltd.), amorphous synthetic silica (trade name: Nipsil L300, a product of Nippon Silica Industrial Co., Ltd., average particle diameter: 7.0 µm), Finesil X-45 (amorphous synthetic silica, average particle diameter: 4.3 µm, a product of TOKUYAMA Corporation), Finesil X-45 (amorphous synthetic silica, average particle diameter: 4.3 µm, a product of TOKUYAMA Corporation), Finesil X-80 (amorphous synthetic silica, average particle diameter: 2.5 µm, a product of TOKUYAMA Corporation), Finesil X-45 (amorphous silica, average particle diameter: 4.3 µm, a product of TOKUYAMA Corporation), Finesil X37B (silica particle, average particle diameter: 2.6 µm, a product of TOKUYAMA Corporation) and Finesil X37B (synthetic amorphous silica, a product of TOKUYAMA Corporation); Sylysia 470 (amorphous silica, average particle diameter: 12 µm, a product of Fuji Silysia Chemical Ltd.), Sylysia 450 (amorphous silica, average particle diameter: 5 µm, a product of Fuji Silysia Chemical Ltd.), synthetic silica (oil absorption: 210 ml/100-g, weight-average particle diameter: 3.5 µm, a product of Fuji Silysia Chemical Ltd.) and Sylysia 740 (amorphous silica, a product of Fuji Silysia Chemical Ltd.); and Carplex #80 (amorphous synthetic silica, average particle diameter: 8.1 µm, a product of Shionogi & Co., Ltd.). Each of these can be used in combination as a mixture.

Examples of the alumina fine particles are high-purity alumina of γ-crystal type AKP-G015 (primary particle diameter: 10 to 15 nm, average particle diameter of secondary aggregate: 2.2 µm, a product of Sumitomo Chemical Co., Ltd.) and high-purity alumina of γ-crystal type AKP-G025 (primary particle diameter: 5 to 10 nm, average particle diameter of secondary aggregate: 3.3 µm, a product of Sumitomo Chemical Co., Ltd.); CATA LOID AP (alumina hydrate, a product of Catalysts & Chemicals Industries Co., Ltd.), CATA LOID A AS-2 (alumina hydrate, a product of Catalysts & Chemicals Industries Co., Ltd.) and CATA LOID A AS-3 (alumina hydrate, a product of Catalysts & Chemicals Industries Co., Ltd.); and γ aluminum oxide Puralox SBa (average primary particle diameter: 55 nm, a product of Condea Chemie). Examples of colloid containing ultrafine alumina particles dispersed in water are Alumina Sol 100, Alumina Sol 200 and Alumina Sol 520 (products of Nissan Chemical Co., Ltd.). Each of these can be used in combination as a mixture, as mentioned above.

The porous layer of alumina hydrate preferably has an average pore diameter of 1 to 15 nm and a pore volume of 0.3 to 1.0 cc/g for sufficient absorptivity and transparency of the porous layer. By using an optically transparent substrate in this case, a recording medium having high optical transparency can be prepared. Even if the substrate is opaque (not transparent), the resulting recording medium does not deteriorate the texture of the substrate and can produce a high-quality image with high color density. The average pore diameter of the porous layer of alumina hydrate is more preferably from 3 to 10 nm.

The porous layer of the recording medium in the present invention serves as an ink-absorbing layer and/or colorant-fixing layer. When the porous layer comprises one layer, it serves as an ink-absorbing layer and colorant-fixing layer. When the porous layer comprises plural layers, a lower layer serves as an ink-absorbing layer, and an upper layer serves as a colorant-fixing layer.

The porous layer preferably further comprises a binder. Examples of the binder are starch or modified derivatives thereof, poly(vinyl alcohol) or modified derivatives thereof, SBR latex, NBR latex, carboxymethylcellulose, hydroxymethylcellulose, polyvinylpyrrolidone and other organic substances.

Hydrophilic binders having high optical transparency and exhibiting higher permeability for the ink solvent are preferably used as the binder. Upon the use of such a hydrophilic binder, the hydrophilic binder must not swell at initial stage of penetration of the ink solvent and must not clog the pores. Accordingly, hydrophilic binders that hardly swell at around room temperature are preferred, of which fully or partially saponified poly(vinyl alcohol)s and cationically modified poly(vinyl alcohol)s are typically preferred.

The amount of the binder is preferably from about 5% by weight to 50% by weight to the weight of the inorganic particles. If the amount of the binder is less than 5% by weight, the alumina hydrate layer may have insufficient strength. If it exceeds 50% by weight, the layer may have insufficient ink absorptivity. The recording sheet may further comprise spherical particles so as to be automatically conveyed. It may also further comprise organic particles.

Among porous layer(s), the uppermost layer preferably has such a pore structure as to have a peak in pore radius distribution curve at 20 nm or less. Thus, a glossy image with high density can be produced. This is because the colorant in the ink is fixed on the surface or in the vicinity thereof of the uppermost porous layer. If the uppermost porous layer has a peak in the pore radius distribution curve larger than the above range, the recording medium may have sufficient ink absorption speed but may have an excessively small dot diameter, thus inviting a decreased image density.

If the 60-degree gloss on the surface of the ink-receiving layer of the recording medium for use in the present invention is less than 10, the resulting image has insufficient gloss as photographic image quality. If it exceeds 80, the resulting image may have decreased gloss, thus deteriorating the balance with a non-image portion. The surface of the ink-receiving layer constitutes a printing plane of the medium and preferably has Beck smoothness of 300 seconds or more. If the Beck smoothness is less than 300 seconds, a pixel may expand heterogeneously or the circularity may be deteriorated, thus inviting noise in photographic gradation.

The pore radius distribution in the present invention may be determined in the following manner. To eliminate influence of the substrate and a lower porous layer, the porous layer is formed on a film, is then peeled off before measurement. It is also acceptable that the porous layer formed on the film is subjected to measurement as intact. The pore distribution can be determined by calculation from a pore volume distribution curve which is in turn determined by a mercury penetration process.

For typically improving conveying ability, the recording medium for use in the present invention may further have a layer mainly comprising particles and a binder on the backside surface of the substrate opposite to the porous layer.

The porous layer is formed on the substrate preferably by preparing a coating composition including the inorganic particles, binder and solvent, applying the coating composition to the substrate and drying the applied layer. The coating is performed preferably using, for example, a die coater, roll coater, air knife coater, blade coater, rod coater, bar coater or comma coater. The solvent for the coating composition can be whichever of an aqueous solvent and non-aqueous solvent.

The thickness of the porous layer is appropriately set typically according to the specifications of the printer. When the porous layer comprises one layer, the thickness is generally preferably from 5 to 50 μm. If the thickness of the porous layer is less than 5 μm, the resulting recording medium may not sufficiently absorb the ink. If it exceeds 50 μm, the porous layer may have deteriorated optical transparency or decreased adhesion strength. When the porous layer comprises plural layers, it is acceptable that the uppermost layer has a thickness of about 1 μm.

Such plural porous layers are formed preferably by adding a solvent (medium) to the inorganic particles and binder to form a coating composition, applying the coating composition to a lower porous layer, and drying the applied film. As in the lower porous layer, the coating is performed preferably using, for example, a die coater, roll coater, air knife coater, blade coater, rod coater, bar coater or comma coater. The solvent for the coating composition can be whichever of an aqueous solvent and non-aqueous solvent.

The thickness of the uppermost layer in the plural porous layers, if formed, is appropriately set according typically to the specifications of the printer and is generally preferably from 0.2 to 15 μm. If the thickness of the uppermost layer is less than 0.2 μm, the ink-fixing properties may not be sufficiently increased. If it exceeds 15 μm, the ink absorptivity may be deteriorated.

A first feature of the ink for use in the recording process of the present invention is that an aqueous ink having a low surface tension of 40 mN/m or less at 25° C. is used as the ink in the ink set. After the intensive investigations on a variety of means for improving the drying property of recorded images, the present inventors have found that an ink can rapidly penetrate into almost all recording materials and be dried by controlling the surface tension of the ink at 40 mN/m or less. In addition, by controlling the surface tension of the ink at 40 mN/m or less, the ink has more wettability with the head member to thereby have increased frequency responsibility and significantly improved discharge stability even if it is a highly viscous ink having a viscosity of 8 mP sec or more at 25° C. The ink with a low surface tension can be prepared by using a polyol or glycol ether having 8 to 11 carbon atoms and an anionic or nonionic surfactant.

A second feature is significantly improved print quality by using a highly viscous ink and an ink set thereof, which has a viscosity of 5 mP sec or more, and preferably 8 mP sec or more at 25° C. An ink with a low viscosity of about 3 mP sec at 25° C. conventionally used in ink-jet printers has a water content of about 70%. In contrast, such a highly viscous ink having a viscosity of about 8 mP sec at 25° C. has a water content of about 50% or less, and water in the ink can be removed at a rate 2.0 to 3.0 times higher than that of the conventional ink when the droplet of the ink reaches the surface of the paper. Thus, the polymer emulsion in a high concentration aggregates at a higher speed on the paper surface, thus substantially avoiding bleed. Specifically, the ink for use in the present invention has a high viscosity but a low surface tension and is thus unique. In contrast to conventional pigments, the polymer emulsion in the ink used in the present invention has excellent image-fixing properties and, by using in combination with the wetting agent for stabilizing dispersion of the emulsion, exhibits outstanding image-fixing properties even on smooth recording media.

A third feature is that the colorant-containing polymer emulsion in the ink has a concentration in terms of solid content of 8% by weight or more, and preferably 10% by weight or more. By increasing the concentration of the polymer emulsion, the ink has an increased viscosity, and the polymer emulsion more satisfactorily aggregates and remains on the surface of the ink-receiving layer of the recording medium, thus increasing the color development density and color tone and avoiding bleed.

A fourth feature is that a high-viscosity wetting agent as a mixture of glycerol and at least one high-viscosity wetting agent selected from glycerol, 1,3-butanediol, triethylene glycol, 1,6-hexanediol, propylene glycol, 1,5-pentanediol, diethylene glycol, dipropylene glycol, trimethylolpropane and trimethylolethane is used instead of a conventional low-viscosity wetting agent as a mixture of ethylene glycol (diethylene glycol) and glycerol. The use of such a high-viscosity wetting agent in combination with a high-concentration pigment can yield a high-viscosity ink.

A fifth feature is the recording medium to receive the ink. More specifically, the fifth feature is that the inorganic particles in the porous layer have a number-average particle diameter of one nanometer to thirty and several nanometers (one nanometer or more and less than forty nanometers), have a content of particles having a primary particle diameter less than 1 nm of less than 10% by number, and have a content of particles having a primary particle diameter exceeding 30 nm of less than 5% by number. Thus, the recording medium can have a smooth ink-receiving surface and can rapidly reproduce sharp ink dots without broadening or bleed of the ink dots even though the high-viscosity ink is used.

A sixth feature is that the porous layer in the recording medium comprises a binder resin for binding the inorganic particles in an amount of 5% by weight to 50% by weight to the amount of the inorganic particles. In contrast to conventional pigments, the polymer emulsion in the ink used in the present invention is viscous and has high affinity for the dispersion medium. The recording medium can receive the ink and absorb the dispersion medium alone from the emulsion particles.

A seventh feature is that the porous layer in the recording medium has a thickness (when it comprises plural layers, the total thickness) of 5 μm to 50 μm. According to the present invention, the recording medium does not require a thick layer, even when it is an ink-jet recording member using a boehmite alumina sol having a low pore volume and a low ink absorptivity. The use of such a boehmite alumina sol in the recording member is described in the conventional techniques in JP-A No. 05-24335 and JP-A No. 11-198520. The present invention can also avoid the following disadvantages. In the conventional techniques, the ink absorptivity increases but the print density significantly decreases with an increasing amount of the ink, since the colorant in the emulsion particles is taken into the inside of the recording medium. In contrast, when the amount of the ink is decreased to allow the pigment component to remain on the surface, bleed becomes worse, the ink solvent is not sufficiently absorbed by the receiving layer and the pigment particles move with the solvent. Thus, the pigment particles distribute unevenly on the receiving layer surface, a white portion of the receiving layer is exposed from the printed portion and the print density often decreases.

A further feature of the present invention is the ink-jet recording process using the ink-medium set. In the process, the ink is ejected according to a recording signal to thereby produce an image on the medium. The ink can be ejected by action of heat energy. The image portion formed by the recording process preferably has a 60-degree gloss not lower than that of a non-image portion. Therefore, the maximum amount of the ink on the medium is preferably 40 g/m$^2$ or less. If the amount exceeds 40 g/m$^2$, the ink may overflow or bleed out.

The ink preferably comprises inks of plural colors including at least cyan, magenta and yellow to thereby form a full-color image on the medium. The ink is more preferably capable of forming an achromatic image without using a black ink containing carbon black as a colorant. If the black ink is a dye ink, the resulting image may have insufficient fastness. In addition, there is apprehension that carbon black adversely affects the human body, and a demand has been made to reduce the amount of carbon black from the environmental viewpoint. To form the full-color or achromatic images, the plural color inks are preferably mixed on the recording medium. In a mixed color image portion, the inks are preferably applied to the medium in increasing order of lightness. If the inks are applied in decreasing order of lightness, uneven density or color boundary bleed may occur.

The ink compositions for use in the present invention are each a recording ink having the following composition and having an ink viscosity of 5 mP sec or more and preferably 8 mP sec or more at 25° C. The ink essentially comprises a colorant for printing, and water for dispersing the colorant and may further comprise a wetting agent, a water-soluble organic solvent, anionic or nonionic surfactant, an emulsion, an antiseptic agent and a pH adjuster added according to necessity. The wetting agents 1 and 2 are mixed for the purpose of utilizing the features of the individual wetting agents and for adjusting the viscosity. However, the wetting agents 1 and 2 are not always used in combination.

(1) Colorant
(2) Wetting agent 1 (glycerol)
(3) Wetting agent 2 (at least one selected from 1,3-butanediol, triethylene glycol, 1,6-hexanediol, propylene glycol, 1,5-pentanediol, diethylene glycol, dipropylene glycol, trimethylolpropane and trimethylolethane)
(4) Water-soluble organic solvent
(5) Anionic or nonionic surfactant
(6) Polyol or glycol ether having 8 to 11 carbon atoms
(7) Antiseptic agent
(8) pH Adjuster
(9) Pure water The components of the inks will be described below.

The colorant comprises a polymer emulsion comprising polymer fine particles having a water-insoluble or hardly-soluble colorant. The phrase "having a (the) colorant" as used in the present invention means either or both of that the polymer fine particles include the colorant therein and that the polymer fine particles adsorb the colorant on their surfaces. It is not always necessary that all of the colorant to be incorporated in the ink of the present invention is contained or adsorbed by the polymer fine particles. The colorant may disperse in the emulsion within a range not adversely affecting the advantages of the present invention. The colorant is not specifically limited, as long as it is insoluble or hardly soluble in water and can be adsorbed by the polymer. The term "water-insoluble or hardly-soluble colorant" means that the colorant is not dissolved in an amount of 10 parts by weight or more in 100 parts by weight of water at 20° C. The term "dissolved" means separation or precipitation of the colorant is not visually observed in the surface layer or lower layer of an aqueous solution. Examples of the colorant are oil-soluble dyes, disperse dyes and other dyes, as well as pigments. Oil-soluble dyes and disperse dyes are preferred from the viewpoints of good adsorption or inclusion, but pigments are preferred from the viewpoint of good light resistance of the resulting image.

The dyes for use in the present invention are dissolved in an organic solvent such as a ketone solvent in an amount of preferably 2 g/liter or more, and more preferably from 20 g/liter to 600 g/liter, for more efficient impregnation of the polymer fine particles with the colorant.

Examples of the pigments for use in the present invention are black pigments such as carbon black, and color pigments such as anthraquinone, phthalocyanine blue, phthalocyanine green, diazo, monoazo, pyranthrone, perylene, heterocyclic yellow, quinacridone and (thio)indigoid pigments. Typical examples of the phthalocyanine blue pigments include copper phthalocyanine blue and derivatives thereof (Pigment Blue 15). Typical examples of the quinacridone pigments are Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Typical examples of the anthraquinone pigments are Pigment Red 43, Pigment Red 194 (perinone red), Pigment Red 216 (brominated pyranthrone red) and Pigment Red 226 (pyranthrone red). Typical examples of the pyrelyne pigments are Pigment Red 123 (vermilion), Pigment Red 149 (scarlet), Pigment Red 179 (maroon), Pigment Red 190 (red), Pigment Violet, Pigment Red 189 (yellow-shaded red) and Pigment Red 224. Typical examples of the thioindigo pigments include Pigment Red 86, Pigment Red 87, Pigment Red 88, Pigment Red 181, Pigment Red 198, Pigment Violet 36 and Pigment Violet 38. Typical examples of the heterocyclic yellow pigments include Pigment Yellow 117 and Pigment Yellow 138. Other examples of suitable coloring pigments can be found in The Colour Index, 3rd Ed. (The Society of Dyers and Colourists, 1982).

The dye can be used in combination with the pigment as the colorant for neutralizing or controlling the color.

The amount of the colorant is preferably from about 10% by weight to about 200% by weight, and more preferably from about 25% by weight to about 150% by weight to the weight of the polymer.

Examples of the polymer constituting the polymer emulsion are vinyl polymers, polyester polymers and polyurethane polymers. Among them, vinyl polymers and polyester polymers such as polymers disclosed in JP-A No. 2000-53897 and No. 2001-139849 are preferred.

According to a preferred embodiment of the present invention, the polymer fine particles having the colorant most preferably has an average particle diameter of 0.16 µm or less in the ink.

The amount in terms of solid content of the polymer fine particles in the ink is preferably from about 8% by weight to about 20% by weight and more preferably from about 8% by weight to about 12% by weight.

The ink of the present invention uses water as a liquid medium. A water-soluble organic solvent as mentioned below is used typically for adjusting the physical properties of the ink, preventing the ink from drying and increasing the dispersion stability. Such water-soluble organic solvents can be used in combination.

Specific examples of the wetting agent and water-soluble organic solvent are as follows:

ethylene glycol, diethylene glycol, triethylene glycol, propylene glycol, dipropylene glycol, tripropylene glycol, tetraethylene glycol, hexylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, petriol and other polyhydric alcohols;

ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and other alkyl ethers of polyhydric alcohols;

ethylene glycol monophenyl ether, ethylene glycol monobenzyl ether, and other aryl ethers of polyhydric alcohols;

2-pyrrolidone, N-methyl-2-pyrrolidone, N-hydroxyethyl-2-pyrrolidone, 1,3-dimethylimidazolidinone, ε-caprolactam, γ-butyrolactone and other nitrogen-containing heterocyclic compounds;

formamide, N-methylformamide, N,N-dimethylformamide and other amides;

monoethanolamine, diethanolamine, triethanolamine, monoethylamine, diethylamine, triethylamine and other amines;

dimethyl sulfoxide, sulfolane, thiodiethanol and other sulfur-containing compounds; and propylene carbonate and ethylene carbonate.

Among these organic solvents, diethylene glycol, thiodiethanol, polyethylene glycol 200 to 600, triethylene glycol, glycerol, 1,2,6-hexanetriol, 1,2,4-butanetriol, petriol, 1,5-pentanediol, 2-pyrrolidone, N-methyl-2-pyrrolidone are preferred for their good solubility and effective prevention of ejection failure due to moisture evaporation.

As another wetting agent, a sugar is preferred. Examples of such sugars (saccharides) are monosaccharides, disaccharides, oligosaccharides (including trisaccharides and tetrasaccharides) and polysaccharides, of which preferred are glucose, mannose, fructose, ribose, xylose, arabinose, galactose, maltose, cellobiose, lactose, sucrose, trehalose and maltotriose. The term "polysaccharide(s)" as used herein means sugars in a broad sense and also includes α-cyclodextrin, cellulose and other naturally-occurring substances.

Examples of derivatives of these sugars are reducing sugars of the aforementioned sugars, such as sugar alcohols represented by the general formula $HOCH_2(CHOH)nCH_2OH$, wherein n is an integer from 2 to 5; oxidized sugars such as aldonic acids and uronic acids; amino acids; and thio acids. Among them, sugar alcohols such as maltitol and sorbitol are preferred.

The suitable amount of these sugars is from 0.1% by weight to 40% by weight, and preferably from 0.5% by weight to 30% by weight of the ink composition.

The ratio of the wetting agent to the pigment significantly affects the discharge stability of the ink from the head. If the amount of the wetting agent is excessively small even though the pigment is contained in a high solid content, water in the vicinity of an ink meniscus rapidly evaporates, thus leading to discharge failure.

The amount of the wetting agent is from 10% by weight to 50% by weight, and that of the colorant-having polymer fine particles is 8% by weight or more, and preferably from 8% by weight to 20% by weight. Thus, the ratio of the wetting agent to the solid content of the polymer fine particles should be from 0.5 to 6.25 and is preferably from 2.0 to 6.0 and most preferably from 3.0 to 5.0. An ink having the ratio within this range shows very good drying property and excellent results in storage tests and reliability tests.

An anionic or nonionic surfactant is used as the surfactant. A suitable surfactant not deteriorating the dispersion stability is selected according to the types and combination of the colorant, wetting agent and water-soluble organic solvent.

Examples of such anionic surfactants are polyoxyethylene alkyl ether acetates, dodecylbenzenesulfonates, laurates and polyoxyethylene alkyl ether sulfates.

Examples of the nonionic surfactants are polyoxyethylene alkyl ethers, polyoxyethylene alkyl esters, polyoxyethylene sorbitan fatty acid esters, polyoxyethylene alkyl phenyl ethers, polyoxyethylene alkylamines and polyoxyethylene alkylamides.

Acetylene glycol surfactants can also be used. Examples are 2,4,7,9-tetramethyl-5-decyne-4,7-diol, 3,6-dimethyl-4-octyne-3,6-diol and 3,5-dimethyl-1-hexyn-3-ol. These are available under the trade names of Surfynol 104,82,465,485 and TG from Air Products and Chemicals, Inc., of which Surfynol 465,104 and TG show satisfactory print quality.

Each of these surfactants can be used alone or in combination.

The use of the surfactant in the present invention improves the wettability with the recording paper. Preferred examples of the surfactant are polyoxyethylene alkyl ether acetates, dialkylsulfosuccinates, polyoxyethylene alkyl ethers, polyoxyethylene alkyl phenyl ethers, polyoxyethylene polyoxypropylene block copolymers, and acetylene glycol surfactants. Specific examples of the anionic surfactant are polyoxyethylene alkyl ether acetates (I) and/or dialkylsulfosuccinates (II) having a branched alkyl chain having 5 to 7 carbon atoms. By using these surfactants, properties to plain paper can be improved and the colorant can be dissolved and dispersed further stably.

[Chemical Formula I]

$$R_1—O—(CH_2CH_2O)mCH_2COOM \quad (I)$$

Wherein $R_1$ is an alkyl group having 6 to 14 carbon atoms which may be branched; m is 3 to 12; and M is an alkali metal ion, a quaternary ammonium, a quaternary phosphonium or an alkanolamine;

[Chemical Formula 2]

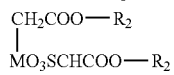

(II)

wherein $R_2$ is a branched alkyl group having 5 to 16 carbon atoms; and M is an alkali metal ion, a quaternary ammonium, a quaternary phosphonium or an alkanolamine;

[Chemical Formula 3]

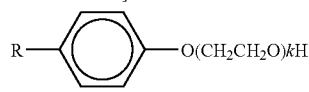

(III)

wherein R is a carbon chain having 6 to 14 carbon atoms which may be branched; and k is from 5 to 20;

[Chemical Formula 4]

$$R—(OCH_2CH_2)nOH \quad (IV)$$

wherein R is a carbon chain having 6 to 14 carbon atoms which may be branched; and n is from 5 to 20;

[Chemical Formula 5]

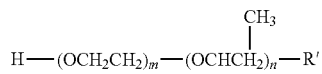

(V)

or

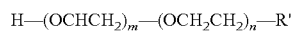

(V)

wherein R' is a carbon chain having 6 to 14 carbon atoms; m is 20 or less; and n is 20 or less;

[Chemical Formula 6]

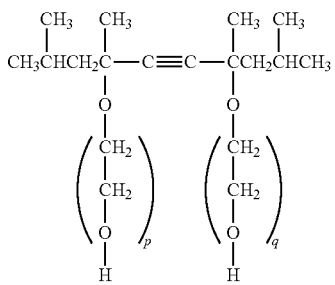

(VI)

wherein p and q are each from 0 to 40.

The surfactant for use in the present invention can have further excellent dissolution stability by using, as a counter ion thereof, lithium ion, and quaternary ammonium or quaternary phosphonium ion represented by the following general formula.

Preferred nonionic surfactants are the polyoxyethylene alkyl phenyl ether surfactants represented by general formula (III) and acetylene glycol surfactants represented by general formula (VI). The combination use of these can synergistically improve the penetrating property, and the resulting ink exhibits reduced color boundary bleed and reduced character bleed.

By controlling the ink to have pH of 6 or more, the ink can further be stably stored. Most of copying paper and writing paper used in offices has pH of 5 to 6. The ink is preferably applied to such recording paper in the following manner. Specifically, the ink is discharged from a fine orifice of 9 to 60 μm as a droplet having a weight of 3 ng to 50 ng at a speed of 5 to 20 m/s and is applied to "plain paper" having a Stokigt sizing degree of 3 seconds or more in an amount in terms of a single color of 1.5 g/m² to 30 g/m². The Stokigt sizing degree herein is determined according to the test process specified in Japanese Industrial Standards (JIS) P-8122. This recording system can produce recorded images with high quality and high resolution. However, the surfactants (II) may often be decomposed and may change their physical properties in storage at pH 9 or higher. Thus, the pH of the ink is preferably set within a range from 6 to 9 when the surfactant (II) is used.

The amount of the surfactants (I), (II), (III), (IV), (V) and (VI) for use in the present invention is from 0.05% by weight to 10% by weight. Within this range, the ink can have desired penetrating property with respect to ink properties required by the printer system. If the amount is 0.05% or less, bleed at the boundary between two colors may occur in the use of any surfactant. If it is 10% by weight or more, the compound may precipitate at low temperatures, thus deteriorating reliability.

Specific examples of the surfactants (I) and (II) for use in the present invention are shown in Table 1 as free acids.

TABLE 1

| | |
|---|---|
| $CH_3(CH_2)_{12}O(CH_2CH_2O)_3CH_2COOH$ | (I-1) |
| $CH_3(CH_2)_{12}O(CH_2CH_2O)_4CH_2COOH$ | (I-2) |
| $CH_3(CH_2)_{12}O(CH_2CH_2O)_5CH_2COOH$ | (I-3) |
| $CH_3(CH_2)_{12}O(CH_2CH_2O)_6CH_2COOH$ | (I-4) |
| $CH_3(CH_2)_{11}CHO(CH_2CH_2O)_6CH_2COOHCH_3$ | (I-5) |

(I-6)

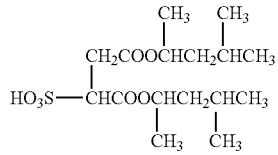

(II-1)

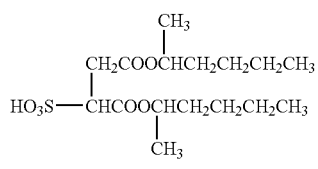

(II-2)

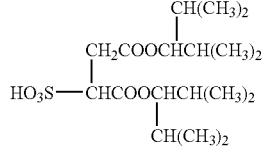

(II-3)

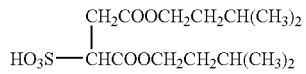

(II-4)

The "surface tension" as used in the present invention is an index showing penetrating property to paper, specifically means a dynamic surface tension determined within 1 second after the formation of surface and is distinguished from a static surface tension which is determined at a saturation time. The surface tension can be determined by any conventional process as described in, for example, JP-A No. 63-31237, as long as it can determine a dynamic surface tension within 1 second. In the present invention, the surface tension is determined using a surface tension meter of Wilhelmy perpendicular plate type. The surface tension is preferably 40 mN/m or less, and more preferably 35 mN/m or less for excellent mage-fixing properties and drying property.

The present inventors have found that the ink can have improved wettability to a heating element, excellent discharge stability and frequency stability by using, as the polyol or glycol ether having 8 to 11 carton atoms, a partially water-soluble polyol and/or glycol ether even in a small amount of 0.1% by weight to 10.0% by weight to the total weight of the recording ink. The partially water-soluble polyol and/or glycol ether herein has a solubility of 0.1% by weight or more and less than 4.5% by weight in water at 25° C.

(1) 2-Ethyl-1,3-hexanediol with a solubility of 4.2% at 20°C.

(2) 2,2,4-Trimethyl-1,3-pentatiediol with a solubility of 2.0% at 25°C.

Such a penetrating agent having a solubility of 0.1% by weight or more and less than 4.5% by weight in water at 25° C. has a very high penetrability in spite of its low solubility. Accordingly the combination use of the penetrating agent having a solubility of 0.1% by weight or more and less than 4.5% by weight in water at 25° C. with another solvent or another surfactant can yield a very highly penetrable ink.

The ink of the present invention may further comprise known or conventional additives in addition to the colorant, solvent and surfactant.

For example, antiseptic-antifungal agents such as sodium dehydroacetate, sodium sorbate, sodium 2-pyridinethiol-1-oxide, sodium benzoate and sodium pentachlorophenol can be used in the present invention.

As a pH adjuster, any substance can be used, as long as it can adjust the pH to 7 or higher without adversely affecting the ink.

Examples thereof are diethanolamine, triethanolamine and other amines, lithium hydroxide, sodium hydroxide, potassium hydroxide and other hydroxides of alkali metal elements, ammonium hydroxide, hydroxides of quaternary ammonium, hydroxides of quaternary phosphonium, lithium carbonate, sodium carbonate, potassium carbonate and other carbonates of alkali metals.

Examples of a chelating agent are sodium ethylenediaminetetraacetate, sodium nitrilotriacetate, sodium hydroxyethyl ethylenediaminetriacetate, sodium diethylenetriaminepentaacetate and sodium uramil diacetate.

Examples of a rust-inhibitor are acidic sulfites, sodium thiosulfate, ammonium thiodiglycolate, diisopropylammonium nitrite, pentaerythritol tetranitrate and dicyclohexylammonium nitrite.

In addition, a water-soluble ultraviolet absorber, water-soluble infrared absorber and other agents can be added according to the purpose.

The ink-medium set of the present invention will be illustrated below.

The ink-medium set of the present invention is a set of ink(s) and recording medium for use in the recording process of the present invention. The ink includes at least yellow, magenta and cyan inks. A black ink is used according to necessity.

A recording liquid cartridge housing the recording liquid of the present invention, and an ink-jet recording apparatus having the recording liquid cartridge will be described below with reference to the drawings. However, each of the following configurations is one of configurational embodiments and is never intended to limit the scope of the present invention.

FIG. 1 is a schematic elevational view of a mechanical unit of a serial ink-jet recording apparatus having an ink cartridge housing the recording liquid according to the present invention.

The mechanical unit of the ink-jet recording apparatus has side plates (1) and (2) at both sides, and a main support guide rod (3) and a second support guide rod (4). The main support guide rod (3) and second support guide rod (4) are substantially horizontally arranged between the side plates (1) and (2) and support a carriage unit (5) slidably in a main scanning direction. The carriage unit (5) has four heads (6) so that their discharge planes (nozzle planes) (6a) face downward. The four heads (6) discharge a yellow (Y) ink, magenta (M) ink, cyan (C) ink and black (Bk) ink, respectively. The carriage unit (5) further has four ink cartridges (7y), (7m), (7c) and (7k) above the heads (6). The ink cartridges serve as ink suppliers for feeding the inks to the four heads (6), respectively, and are exchangeably loaded.

The carriage unit (5) is connected to a timing belt (11). The timing belt (11) is spanned between a driving pulley (driving timing pulley) (9) and a driven pulley (idler pulley) (10), which driving pulley (9) is rotated by a main scanning motor (8). By driving and controlling the main scanning motor (8), the carriage (5), namely the four heads (6), is moved in the main scanning direction.

Subframes (13) and (14) are vertically arranged on a base plate (12) connecting between the side plates (1) and (2). Between the subframes (13) and (14) is rotatably held a conveyer roller (15) for conveying a paper (16) in a secondary scanning direction perpendicular to the main scanning direction. A secondary scanning motor (17) is arranged on the side of the subframe (14). To transmit the rotation of the secondary scanning motor (17) to the conveyer roller (15), a gear (18) is fixed to the rotation shaft of the secondary scanning motor (17), and another gear (19) is fixed to the shaft of the conveyer roller (15).

Further, a mechanism (21) for maintaining and improving reliability of the heads (6) (hereinafter referred to as "subsystem") arranged between the side plate (1) and the subframe (12). The subsystem (21) is configured in the following manner. Four cap means (22) for capping discharge planes of the heads (6) is held by a holder (23). The holder (23) is rockably held by a link member (24). When the carriage unit (5) moves in the main scanning direction and comes in contact with a catching part (25) arranged on the holder (23), the holder (23) is lifted up to thereby allow the capping means (22) to cap the discharge planes (6a) of the ink-jet heads (6). When the carriage unit (5) moves toward a printing area, the holder (23) is lifted down to thereby allow the cap means (22) to depart from the discharge planes (6a) of the ink-jet heads (6).

Each of the cap means (22) is connected to a suction pump (27) via a suction tube (26), has an air release port and hereby communicates to the air via an air release tube and an air release valve. The suction pump (27) aspirates a waste liquid and emits the same to a waste reservoir (not shown) typically via a drain tube. A wiper blade (28) is fixed to a blade arm (29) at the side of the holder (23). The wiper blade (28) is wiping means for wiping the discharge planes (6a) of the ink-jet heads (6) and comprises a fibrous member, foaming member or elastic member such as rubber. The blade arm (29) is rockably pivoted and is rocked by the rotation of a cam which is rotated by a driving means (not shown).

The ink cartridge (7) will be illustrated below with reference to FIGS. 2 and 3.

Figure 2:
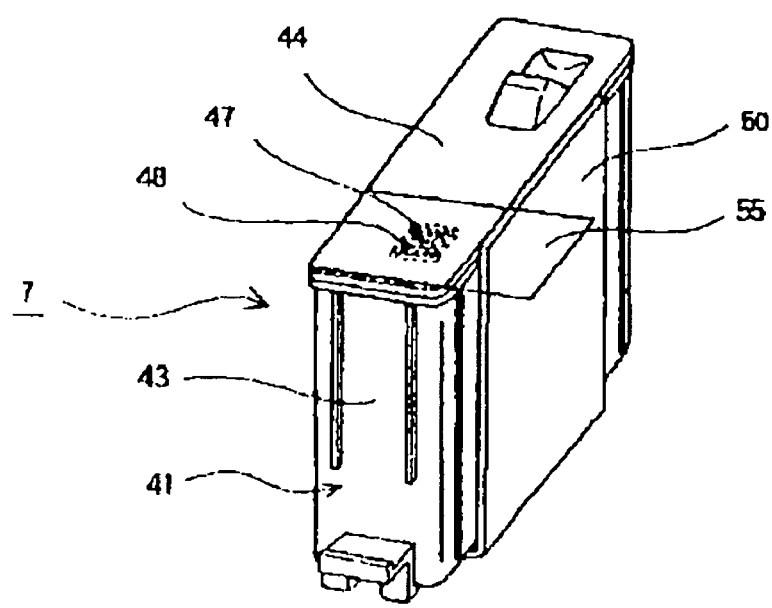
FIG. 2 is an external perspective view of an ink cartridge before placing into the recording apparatus of the present invention.
Figure 3:
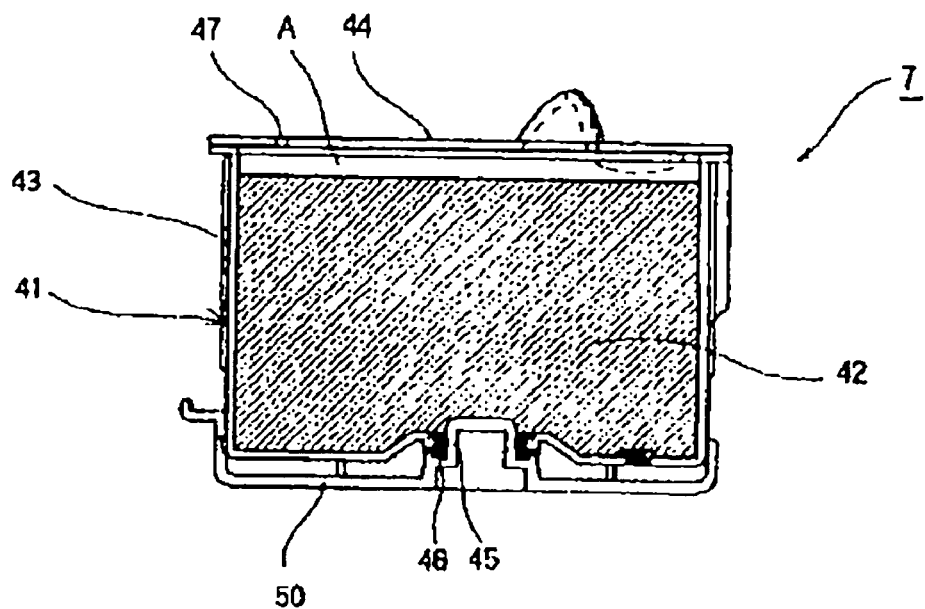
FIG. 3 is an elevational view in section of the ink cartridge of the present invention.

FIGS. 2 and 3 are an external perspective view and an elevational view in section of the ink cartridge before loaded to a recording apparatus.

With reference to FIG. 3, the ink cartridge (7) has a cartridge main body (41) housing an ink absorber (42) which absorbs an ink of predetermined color. The cartridge main body (41) is made of typically a resinous molded article and comprises a case (43) having a wide opening on its top and an upper lid member (44) adhered or melt-fixed to the top opening. The ink absorber (42) comprises a porous substance such as a urethane foam, is compressed and inserted into the cartridge main body (41) before absorbing the ink.

The case (43) of the cartridge main body (41) has an ink supply port (45) at its bottom for supplying the ink to the recording head (6), and a sealing ring (46) is engaged to the inner wall of the ink supply port (45). The upper lid member (44) has an air release port (47).

The cartridge main body (41) has a capping member (50). The capping member (50) serves to cover the ink supply port (45) before loading and to prevent the inside ink from leaking when the cartridge is handled typically in loading, transporting or vacuum-packaging and a pressure is applied to the wide side walls to thereby compress and deform the case (43).

With reference to FIG. 2, the air release port (47) has a film sealing member (55) having an oxygen permeability of 100 ml/m$^2$ or more adhered to the upper lid member (44) to seal the same. The sealing member (55) has such a size as to cover and seal the air release port (47) as well as plural grooves (48) arranged around the air release port (47). The air release port (47) is thus sealed by the sealing member (55) having an oxygen permeability of 100 ml/m$^2$ or more, and in addition, the ink cartridge (7) is packaged under reduced pressure with a packaging member such as a gas-impermeable aluminum laminated film. This configuration can increase the deaeration of the ink even if the ink contains dissolved gas due to the air contaminated during ink charging or the air in a space (A) (FIG. 3) formed between the ink absorber (42) and the cartridge main body (41), since the air in the ink is exhausted to a highly vacuum space between the cartridge main body (41) and the outer packaging member via the sealing member (55).

Figure 4:
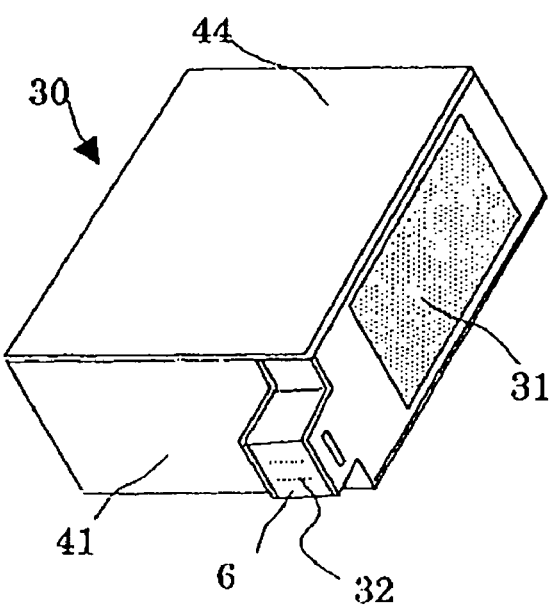
FIG. 4 is an external perspective view of a recording unit integrated with a recording head according to the present invention.

FIG. 4 illustrates a configuration of a recording cartridge having a recording liquid container housing the recording liquid of the present invention, and a head unit for discharging droplets of the recording liquid.

More specifically, a recording unit (30) is a serial type recording unit and mainly comprises an ink-jet head (6), an ink tank (41) housing the recording liquid to be supplied to the ink-jet head (6), and a lid member sealing the ink tank (41). The ink-jet head (6) has a multiplicity of nozzles (32) for discharging the recording liquid. The recording liquid is fed from the ink tank (41) via an ink supply tube (not shown) to a common chamber (not shown) and is discharged from the nozzles (32) according to an electric signal inputted through an electrode (31) from the recording apparatus main body. The recording unit of this type has a structure suitable for a "thermal" or "bubble" head driven by action of heat energy. This type of head can be prepared at low cost. The recording liquid of the present invention comprises a polyol or glycol ether having 8 to 11 carbon atoms, thereby has discharge stability and frequency stability, is safe even if the above component is added in a small amount and is very suitable in recording systems such as bubble or thermal system.

The serial ink-jet recording apparatus is taken as an example in the above description, but the recording liquid of the present invention can also be applied to a recording apparatus having a "line head", in which nozzles and other components are integrated at a density of equal to or one severalths the resolution of the target image in an optional arrangement such as staggered arrangement and in a width larger than that of the recording medium.

The "recording apparatus" used herein can be an output printer for personal computers or digital cameras, as well as an apparatus having composite functions in combination with, for example, facsimile, scanner and/or telephone.

The present invention will be described with reference to several examples and comparative examples below, which are not intended to limit the scope of the present invention.

Preparation 1 of Recording Media

Preparation of Silica Fine Particles for Recording Medium

[Silica Fine Particles A]

A synthetic amorphous silica having an average secondary particle diameter of 2 μm (a product of Nippon Silica Industrial Co., Ltd. under the trade name of Nipsil HD, average primary particle diameter: 13 nm) was dispersed in a sand grinder and was further dispersed using an ultrasonic homogenizer. The dispersion procedures using the sand grinder and ultrasonic homogenizer were repeated until the average secondary particle diameter reached 250 nm and thereby yielded a 15% aqueous solution.

[Silica Fine Particles B]

A synthetic amorphous silica having an average secondary particle diameter of 2.2 μm (a product of Nippon Silica Industrial Co., Ltd. under the trade name of Nipsil K-300, average primary particle diameter: 15 nm) was dispersed in a sand grinder and was further dispersed using an ultrasonic homogenizer. The dispersion procedures using the sand grinder and ultrasonic homogenizer were repeated until the average secondary particle diameter reached 90 nm and thereby yielded a 12% aqueous solution.

[Silica Fine Particles C]

A synthetic amorphous silica having an average secondary particle diameter of 2 μm (a product of Nippon Silica Industrial Co., Ltd. under the trade name of Nipsil HD, average primary particle diameter: 13 nm) was dispersed in a sand grinder and was further dispersed using an ultrasonic homogenizer. The dispersion procedures using the sand grinder and ultrasonic homogenizer were repeated until the average secondary particle diameter reached 40 nm and thereby yielded a 8% aqueous solution.

(Recording Medium 1)

To 100 parts of a synthetic amorphous silica having an average secondary particle diameter of 4.5 μm (a product of TOKUYAMA Corporation under the trade name of Finesil X-45, average primary particle diameter: about 15 nm) was added 40 parts of a poly(vinyl alcohol) (PVA) (a product of Kuraray Co., Ltd. under the trade name of PVA-117, degree of polymerization: 1800, degree of saponification: 98.5%) and thereby yielded a 15% aqueous solution. The aqueous solution was applied to a resin-coated paper (an enamel paper laminated with a polyethylene 18 μm thick) to a coating amount of 15 g/m$^2$ using a wire bar, was dried and thereby yielded a lower porous layer.

Subsequently, a 12% aqueous solution containing 100 parts of Silica Fine Particles A and 40 parts of a poly(vinyl alcohol) (PVA) (a product of Kuraray Co., Ltd. under the trade name of PVA-135H) was applied to a coating amount of 5 g/m$^2$ using a wire bar, was dried and thereby yielded an uppermost porous layer, to yield a recording medium according to the present invention. The uppermost porous layer had a peak in a pore radius distribution curve at 44 nm.

(Recording Medium 2)

A 12% aqueous solution containing 100 parts of Silica Fine Particles B and 40 parts of a poly(vinyl alcohol) (PVA) (a product of Kuraray Co., Ltd. under the trade name of PVA-135H) was applied to the lower porous layer of Recording Medium 1 to a coating amount of 5 g/m$^2$ using a wire bar, was dried and thereby yielded an uppermost porous layer, to yield Recording Medium 2. The uppermost porous layer had a peak in a pore radius distribution curve at 19 nm.

(Recording Medium 3)

A 8% aqueous solution containing 100 parts of Silica Fine Particles C and 40 parts of a poly(vinyl alcohol) (PVA) (a product of Kuraray Co., Ltd. under the trade name of PVA-135H) was applied to the lower porous layer of Recording Medium 1 to a coating amount of 5 g/m$^2$ using a wire bar, was dried and thereby yielded an uppermost porous layer, to yield Recording Medium 3. The uppermost porous layer had a peak in a pore radius distribution curve at 8 nm.

(Recording Medium 4)

A 10% aqueous solution containing 100 parts of silica sol having an average primary particle diameter of 15 nm and 35 parts of a poly(vinyl alcohol) having a silanol group (a product of Kuraray Co., Ltd. under the trade name of R-Polymer R-1130) was applied to the lower porous layer of Recording Medium 1 to a coating amount of 5 g/m$^2$ using a wire bar, was dried and thereby yielded an uppermost porous layer, to yield Recording Medium 4. The uppermost porous layer had a peak in a pore radius distribution curve at 4 nm.

(Recording Medium 5)

COMPARATIVE EXAMPLE 1

A poly(vinyl alcohol) having a degree of polymerization of 2000 and a degree of saponification of 88% by mole was acetalized with benzaldehyde to a degree of acetalization of 9% by mole. The resulting poly(vinyl acetal) resin was dissolved in a 6:4 solvent mixture containing water and isopropyl alcohol and was mixed with a urea-glyoxal-acrylamide polycondensate (SUMILASE RESIN 5004; a product of Sumitomo Chemical Co., Ltd.) in an amount of 0.4% by weight to the solid content of the poly(vinyl acetal) resin. The mixture was applied to a resin-coated paper (an enamel paper laminated with a polyethylene 18 μm thick), was dried and thereby yielded a recording medium having an ink-receiving layer having a dry weight of 12 g/m$^2$ and containing no inorganic particles.

Preparation 2 of Recording Media (Recording Medium 6)

A coating composition was prepared by mixing 32 g of a 6.2% by weight aqueous solution of a poly(vinyl alcohol) with 100 g of an alumina sol having a solid content of 18% by weight and being prepared by hydrolysis and deflocculation of an aluminum alkoxide. The coating composition was applied to a white poly(ethylene terephthalate) film 100 μm thick to a dry coating amount of 26 g/m$^2$ using a bar coater, was dried and thereby yielded a pseudoboehmite layer. The resulting article was heated at 140° C. and thereby yielded Recording Medium 6. The uppermost porous layer had a peak in a pore radius distribution curve at 8 nm.

(Recording Medium 7)

A coating composition was prepared by mixing 32 g of a 6.2% by weight aqueous solution of a poly(vinyl alcohol) with 100 g of an alumina sol having a solid content of 18% by weight and being prepared by hydrolysis and deflocculation of an aluminum alkoxide. The coating composition was applied to a white poly(ethylene terephthalate) film 100 μm thick to a dry coating amount of 26 g/m$^2$ using a bar coater, was dried and thereby yielded a pseudoboehmite layer. Next, a silica sol coating composition was applied and dried to form a silica gel layer 1 μm thick. The silica sol coating composition contained a silica sol having a primary particle diameter of 10 to 20 nm and a poly(vinyl alcohol) copolymer having a silanol group (a product of Kuraray Co., Ltd. under the trade name of R-Polymer R-1130) and had a solid content of 5% by weight (the ratio of the copolymer to SiO$_2$:0.3). The resulting article was heated at 140° C. and thereby yielded Recording Medium 7. The uppermost porous layer had a peak in a pore radius distribution curve at 3 nm.
(Recording Medium 8)

A coating composition was prepared by mixing 60 g of a 6.2% by weight aqueous solution of a poly(vinyl alcohol) with 100 g of an alumina sol having a solid content of 18% by weight and being prepared by hydrolysis and deflocculation of an aluminum alkoxide. The coating composition was applied and dried to the pseudoboehmite layer of Recording Medium 6 to a dry coating amount of 1 g/m$^2$. The resulting article was heated at 140° C. and thereby yielded Recording Medium 8. The uppermost porous layer had a peak in a pore radius distribution curve at 6 nm.
(Recording Medium 9)

COMPARATIVE EXAMPLE 2

A poly(vinyl alcohol) having a degree of polymerization of 2000 and a degree of saponification of 88% by mole was acetalized with benzaldehyde to a degree of acetalization of 9% by mole. The resulting poly(vinyl acetal) resin was dissolved in a 6:4 solvent mixture containing water and isopropyl alcohol and was mixed with a urea-glyoxal-acrylamide polycondensate (SUMILASE RESIN 5004; a product of Sumitomo Chemical Co., Ltd.) in an amount of 0.4% by weight to the solid content of the poly(vinyl acetal) resin. The mixture was applied to a white poly(ethylene terephthalate) film 100 µm thick, was dried at 120° C. for 5 minutes and thereby yielded Recording Medium 9 having an ink-receiving layer with a dry weight of 12 g/m$^2$.
(Recording Medium 10)

Recording Medium 10 was prepared by the procedure of Recording Medium 7, except that an optically transparent poly(ethylene terephthalate) film 100 µm thick was used as the substrate. The uppermost porous layer had a peak in a pore radius distribution curve at 3 nm.

Preparation of Ink

REFERENCE EXAMPLE 1

Preparation of Polymer Fine Particle Dispersion Containing Phthalocyanine Pigment A blue polymer fine particle dispersion was prepared according to the procedure of Preparation Example 3 described in JP-A No. 2001-139849.
Specific procedures are shown below.
(1) Preparation of Polymer Solution The inside atmosphere of a 1-liter flask equipped with a mechanical stirrer, thermometer, nitrogen gas feed tube, condenser and dropping funnel was thoroughly replaced with nitrogen gas, and 11.2 g of styrene, 2.8 g of acrylic acid, 12.0 g of lauryl methacrylate, 4.0 g of polyethylene glycol methacrylate, 4.0 g of a styrene macromer AS-6 (trade name, a product of Toagosei Co., Ltd.) and 0.4 g of mercaptoethanol were placed therein, and the mixture was raised in temperature to 65° C.

Next, a mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of a styrene macromer AS-6 (trade name, a product of Toagosei Co., Ltd.), 3.6 g of mercaptoethanol, 2.4 g of azobisdimethylvaleronitrile and 18 g of methyl ethyl ketone was added dropwise to the above mixture in the flask over 2.5 hours.

After the completion of addition, a mixture of 0.8 g of azobisdimethylvaleronitrile and 18 g of methyl ethyl ketone was added dropwise to the mixture in the flask over 0.5 hour. After aging at 65° C. for 1 hour, 0.8 g of azobisdimethylvaleronitrile was further added, followed by aging for further 1 hour.

After the completion of the reaction, 364 g of methyl ethyl ketone was added, to yield 800 g of a 50% solution of a polymer.
(2) Preparation of Polymer Fine Particle Aqueous Dispersion The polymer solution (28 g) prepared in the above (1) was thoroughly mixed with 26 g of a phthalocyanine pigment (a product of Dainippon Ink & Chemicals, Inc. under the trade name of TGR-SD), 13.6 g of a 1 mol/liter aqueous potassium hydroxide solution, 20 g of methyl ethyl ketone and 30 g of ion-exchanged water. The mixture was kneaded in a three-roll mill twenty times. The paste was thoroughly mixed with 200 g of ion-exchanged water, from which methyl ethyl ketone and water were distilled off using an evaporator, to yield a blue dispersion of polymer fine particles.

The polymer fine particles had an average particle diameter (D50%) of 93 nm as detemrined with a Microtrac UPA.

REFERENCE EXAMPLE 2

Preparation of Polymer Fine Particle Dispersion Containing Dimethylquinacridone Pigment A purplish red (magenta) dispersion of polymer fine particles was prepared by the procedure of Reference Example 1, except for using Pigment Red 122 instead of the phthalocyanine pigment. The polymer fine particles had an average particle diameter (D50%) of 127 nm as detemrined with a Microtrac UPA.

REFERENCE EXAMPLE 3

Preparation of Polymer Fine Particle Dispersion Containing Monoazo Yellow Pigment A yellow dispersion of polymer fine particles was prepared by the procedure of Reference Example 1, except for using Pigment Yellow 74 instead of the phthalocyanine pigment. The polymer fine particles had an average particle diameter (D50%) of 76 nm as detemrined with a Microtrac UPA.

REFERENCE EXAMPLE 4

Preparation of Polymer Fine Particle Dispersion Containing Carbon Black

A black dispersion of polymer fine particles was prepared by the procedure of Reference Example 1, except for using carbon black (FW 100, a product of Degussa AG) instead of the phthalocyanine pigment. The polymer fine particles had an average particle diameter (D50%) of 104 nm as determined with a Microtrac UPA.

REFERENCE EXAMPLE 5

Carbon Black Dispersion 1 Treated with Diazo Compound (for Self-dispersible Black Ink)

In 750 g of water were dispersed 100 g of carbon black having a surface area of 230 m$^2$/g and a DBP oil absorption of 70 ml/100-g and 34 g of p-amino-N-benzoic acid. Then, 16 g of nitric acid was added dropwise thereto and was stirred at 70° C. Five minutes later, a solution of 11 g of sodium nitrite in 50 g of water was added, followed by stirring for further 1 hour. The slurry was diluted 10 folds and was centrifuged to remove coarse particles. After adjusting pH to 8 to 9 with diethanolamine, the dispersion was desalted and concentrated using an ultrafilter and thereby yielded a carbon black dispersion having a pigment concentration of 15%. The dispersion was filtrated through a 0.5-μm polypropylene filter and thereby yielded Carbon Black Dispersion 1 having an average particle diameter (D50%) of 99 nm as determined with a Microtrac UPA.

(Ink 1)

An ink composition having the following formulation was prepared, which pH was adjusted to 9 with a 10% aqueous lithium hydroxide solution. The composition was filtrated through a membrane filter having an average pore diameter of 0.8 μm and thereby yielded a target ink composition.

| | |
|---|---|
| Phthalocyanine pigment-containing polymer fine particles of Reference Example 1 | 8.0% by weight (in terms of solid content) |
| Triethylene glycol | 22.5% by weight |
| Glycerol | 7.5% by weight |
| 2-Pyrrolidone | 5.0% by weight |
| Surfactant of Example (I-1) in Table 1 | 2.0% by weight |
| 2-Ethyl-1,3-hexanediol | 2.0% by weight |
| Proxel LV (antiseptic agent) | 0.2% by weight |
| Ion-exchanged water | balance |

(Ink 2)

An ink composition was prepared by the procedure of Ink 1, except for using the following composition and adjusting pH to 9 with sodium hydroxide.

| | |
|---|---|
| Dimethylquinacridone pigment-containing polymer fine particles of Reference Example 2 | 8.0% by weight (in terms of solid content) |
| Propylene glycol | 30.0% by weight |
| Glycerol | 10.0% by weight |
| N-Methyl-2-pyrrolidone | 2.0% by weight |
| Surfactant of Example (I-2) in Table 1 | 2.0% by weight |
| 2,2,4-Trimethyl-1,3-pentanediol | 2.0% by weight |
| Proxel LV (antiseptic agent) | 0.2% by weight |
| Ion-exchanged water | balance |

(Ink 3)

An ink composition was prepared by the procedure of Ink 1, except for using the following composition and adjusting pH to 9 with lithium hydroxide.

| | |
|---|---|
| Monoazo yellow pigment-containing polymer fine particles of Reference Example 3 | 8.0 % by weight (in terms of solid content) |
| 1,3-Butanediol | 22.5% by weight |
| Glycerol | 7.5% by weight |
| 2-Pyrrolidone | 5.0% by weight |
| Surfactant of Example (I-4) in Table 1 | 2.0% by weight |
| 2,2,4-Trimethyl-1,3-pentanediol | 2.0% by weight |
| Proxel LV (antiseptic agent) | 0.2% by weight |
| Ion-exchanged water | balance |

(Ink 4)

Black Pigment Ink

An ink composition was prepared by the procedure of Ink 1, except for using the following composition and adjusting pH to 9 with sodium hydroxide.

| | |
|---|---|
| Carbon black-containing polymer fine particles of Reference Example 4 | 8.0% by weight (in terms of solid content) |
| Dipropylene glycol | 20.0% by weight |
| Glycerol | 10.0% by weight |
| N-Hydroxyethyl-2-pyrrolidone | 5.0% by weight |
| Surfactant of Example (I-3) in Table 1 | 2.0% by weight |
| 2-Ethyl-1,3-hexanediol | 2.0% by weight |
| Proxel LV (antiseptic agent) | 0.2% by weight |
| Ion-exchanged water | balance |

(Ink 5)

An ink composition was prepared by the procedure of Ink 1, except for using the following composition and adjusting pH to 9 with lithium hydroxide.

| | |
|---|---|
| Phthalocyanine pigment-containing polymer fine particles of Reference Example 1 | 12.0% by weight (in terms of solid content) |
| 2,3-Butanediol | 22.5% by weight |
| Glycerol | 7.5% by weight |
| N-Methyl-2-pyrrolidone | 3.0% by weight |
| Surfactant of Example (I-5) in Table 1 | 2.0% by weight |
| 2-Ethyl-1,3-hexanediol | 2.0% by weight |
| Proxel LV (antiseptic agent) | 0.2% by weight |
| Ion-exchanged water | balance |

(Ink 6)

An ink composition was prepared by the procedure of Ink 1, except for using the following composition and adjusting pH to 9 with lithium hydroxide.

| | |
|---|---|
| Dimethylquinacridone pigment-containing polymer fine particles of Reference Example 2 | 12.0% by weight (in terms of solid content) |
| Dipropylene glycol | 15.0% by weight |
| Glycerol | 15.0% by weight |
| N-Hydroxyethyl-2-pyrrolidone | 5.0% by weight |
| Surfactant of Example (I-6) in Table 1 | 2.0% by weight |
| 2,2,4-Trimethyl-1,3-pentanediol | 2.0% by weight |
| Proxel LV (antiseptic agent) | 0.2% by weight |
| Ion-exchanged water | balance |

(Ink 7)

An ink composition was prepared by the procedure of Ink 1, except for using the following composition and adjusting pH to 9 with lithium hydroxide.

| | |
|---|---|
| Monoazo yellow pigment-containing polymer fine particles of Reference Example 3 | 12.0% by weight (in terms of solid content) |
| 1,3-Propanediol | 22.5% by weight |
| Glycerol | 7.5% by weight |
| 2-Pyrrolidone | 5.0% by weight |
| Surfactant of Example (II-1) in Table 1 | 2.0% by weight |
| 2-Ethyl-1,3-hexanediol | 2.0% by weight |

-continued

| | |
|---|---|
| Proxel LV (antiseptic agent) | 0.2% by weight |
| Ion-exchanged water | balance |

(Ink 8)

COMPARATIVE EXAMPLE 3

An ink composition was prepared by the procedure of Ink 1, except for using the following composition and adjusting pH to 9 with lithium hydroxide.

| | |
|---|---|
| Carbon black dispersion 1 treated with diazo compound of Reference Example 5 | 8.0% by weight (in terms of solid content) |
| 1,4-Butanediol | 22.5% by weight |
| Glycerol | 7.5% by weight |
| N-Methyl-2-pyrrolidone | 2.0% by weight |
| Surfactant of Example (II-2) in Table 1 | 2.0% by weight |
| 2,2,4-Trimethyl-1,3-pentanediol | 2.0% by weight |
| Emulsion | 3.0% by weight |
| Proxel LV (antiseptic agent) | 0.2% by weight |
| Ion-exchanged water | balance |

(Ink 9)

An ink composition was prepared by the procedure of Ink 1, except for using the following composition and adjusting pH to 9 with lithium hydroxide.

| | |
|---|---|
| Phthalocyanine pigment-containing polymer fine particles of Reference Example 1 | 15.0% by weight (in terms of solid content) |
| 1,5-Pentanediol | 15.0% by weight |
| Glycerol | 15.0% by weight |
| N-Hydroxyethyl-2-pyrrolidone | 2.0% by weight |
| Surfactant of Example (II-3) | 2.0% by weight |
| 2-Ethyl-1,3-hexanediol | 2.0% by weight |
| Proxel LV (antiseptic agent) | 0.2% by weight |
| Ion-exchanged water | balance |

(Ink 10)

An ink composition was prepared by the procedure of Ink 1, except for using the following composition and adjusting pH to 9 with lithium hydroxide.

| | |
|---|---|
| Dimethylquinacridone pigment-containing polymer fine particles of Reference Example 2 | 15.0% by weight (in terms of solid content) |
| 1,6-Hexanediol | 22.5% by weight |
| Glycerol | 7.5% by weight |
| 2-Pyrrolidone | 3.0% by weight |
| Surfactant of Example (II-4) | 2.0% by weight |
| 2,2,4-Trimethyl-1,3-pentanediol | 2.0% by weight |
| Proxel LV (antiseptic agent) | 0.2% by weight |
| Ion-exchanged water | balance |

(Ink 11)

An ink composition was prepared by the procedure of Ink 1, except for using the following composition and adjusting pH to 9 with sodium hydroxide.

| | |
|---|---|
| Monoazo yellow pigment-containing polymer fine particles of Reference Example 3 | 15.0% by weight (in terms of solid content) |
| 2-Methyl-2,4-pentanediol | 22.5% by weight |
| Glycerol | 7.5% by weight |
| N-Methyl-2-pyrrolidone | 5.0% by weight |
| Surfactant of General Formula (III) wherein R is C6, and k is 5) | 2.0% by weight |
| 2-Ethyl-1,3-hexanediol | 2.0% by weight |
| Proxel LV (antiseptic agent) | 0.2% by weight |
| Ion-exchanged water | balance |

(Ink 12)

An ink composition having the following formulation was prepared, which pH was adjusted to 9 with a 10% aqueous lithium hydroxide solution. The composition was filtrated through a membrane filter having an average pore diameter of 0.8 μm and thereby yielded a target ink composition.

| | |
|---|---|
| Phthalocyanine pigment-containing polymer fine particles of Reference Example 1 | 5.0% by weight |
| Ethylene glycol | 15.0% by weight |
| Glycerol | 5.0% by weight |
| 2-Pyrrolidone | 2.0% by weight |
| ECTD-3NEX (anionic surfactant, a product of Nikko Chemicals Co., Ltd.) | 1.0% by weight |
| 2-Ethyl-1,3-hexanediol | 2.0% by weight |
| Emulsion | 3.0% by weight |
| Proxel LV (antiseptic agent) | 0.2% by weight |
| Ion-exchanged water | balance |

(Ink 13)

An ink composition was prepared by the procedure of Ink 12, except for using the following composition and adjusting pH to 9 with lithium hydroxide.

| | |
|---|---|
| Dimethylquinacridone pigment-containing polymer fine particles of Reference Example 2 | 6.0% by weight |
| Diethylene glycol | 15.0% by weight |
| Glycerol | 5.0% by weight |
| N-Methyl-2-pyrrolidone | 2.0% by weight |
| ECTD-6NEX (anionic surfactant, a product of Nikko Chemicals Co., Ltd.) | 1.0% by weight |
| 2,2,4-Trimethyl-1,3-pentanediol | 2.0% by weight |
| Proxel LV (antiseptic agent) | 0.2% by weight |
| Ion-exchanged water | balance |

(Ink 14)

An ink composition was prepared by the procedure of Ink 12, except for using the following composition and adjusting pH to 9 with lithium hydroxide.

| | |
|---|---|
| Monoazo yellow pigment-containing polymer fine particles of Reference Example 3 | 5.0% by weight |
| Triethylene glycol | 15.0% by weight |
| Glycerol | 5.0% by weight |
| N-Hydroxyethyl-2-pyrrolidone | 2.0% by weight |
| Dispanol TOC (nonionic surfactant, a product of NOF Corporation) | 1.0% by weight |
| 2-Ethyl-1,3-hexanediol | 2.0% by weight |
| Emulsion | 3.0% by weight |
| Proxel LV (antiseptic agent) | 0.2% by weight |
| Ion-exchanged water | balance |

(Ink 15)

COMPARATIVE EXAMPLE 4

An ink composition was prepared by the procedure of Ink 1, except for using the following composition and adjusting pH to 9 with sodium hydroxide.

| | |
|---|---|
| Carbon Black Dispersion 1 treated with diazo compound of Reference Example 5 | 4.0% by weight (in terms of pigment solid content) |
| Ethylene glycol | 15.0% by weight |
| Glycerol | 5.0% by weight |
| 2-Pyrrolidone | 2.0% by weight |
| ECTD-6NEX (anionic surfactant, a product of Nikko Chemicals Co., Ltd.) | 1.0% by weight |
| 2,2,4-Trimethyl-1,3-pentanediol | 2.0% by weight |
| Proxel LV (antiseptic agent) | 0.2% by weight |
| Ion-exchanged water | Balance |

The pigment concentrations, wetting agent concentrations and ink viscosity of the ink compositions of Inks 1 through 15 are shown in Table 2 below.

TABLE 2

| | | Pigment solid concentration (% by weight) | Wetting agent concentration (% by weight) | Viscosity mP·sec (25° C.) |
|---|---|---|---|---|
| Ink Set 1 | Ink 1 CYAN | 8.0 | 30.0 | 6.3 |
| | Ink 2 MAG | 8.0 | 40.0 | 7.6 |
| | Ink 3 YEL | 8.0 | 30.0 | 6.1 |
| | Ink 4 BK | 8.0 | 30.0 | 8.1 |
| Ink Set 2 | Ink 5 CYAN | 12.0 | 30.0 | 8.9 |
| | Ink 6 MAG | 12.0 | 30.0 | 9.6 |
| | Ink 7 YEL | 12.0 | 30.0 | 9.2 |
| | Ink 4 BK | 8.0 | 30.0 | 8.1 |
| Ink Set 3 | Ink 9 CYAN | 15.0 | 30.0 | 9.3 |
| | Ink 10 MAG | 15.0 | 30.0 | 10.3 |
| | Ink 11 YEL | 15.0 | 30.0 | 9.6 |
| | Ink 8 BK (self-dispersible) | 8.0 | 30.0 | 8.4 |
| Ink Set 4 | Ink 12 CYAN | 5.0 | 20.0 | 2.6 |
| | Ink 13 MAG | 6.0 | 20.0 | 2.9 |
| | Ink 14 YEL | 5.0 | 20.0 | 2.8 |
| | Ink 15 BK (self-dispersible) | 4.0 | 20.0 | 3.2 |

Next, the recording media and Ink Sets 1 to 4 comprising cyan, magenta, yellow and black inks selected from Inks 1 to 15 were subjected to the following tests. The results are shown in Tables 3 and 4.

1) Sharpness of Image (1) Printing was performed on each of the following paper using an ink-jet printer EM-900 (a product of Seiko Epson Corporation) at a varying driving voltage of head, frequency and pulse width. For yellow, magenta and cyan color pigment inks, a printing pattern with 100% duty was printed. For the black ink containing the black ink of the present invention, characters were printed simultaneously. Single-pass printing was performed at Mj of 35 µl, Vj of 20 m/sec, a frequency of 1 kHz and a recording density of 720 dpi.

(2) Solid images and character images were printed according to a single-pass printing procedure under the same conditions as (1) using an ink-jet printer IPSIO Jet 300 available from Ricoh Company, Limited at a varying driving voltage of head, frequency and pulse width.

After drying the printed images, bleed at boundary between two colors and image bleed were visually observed and were evaluated according to the criteria. A clock meter attached with a cotton cloth was reciprocated five times, and the scratch resistance of the character image portion was determined based on the degree of coloring of the cotton cloth.

Criteria

<Bleed between Two Colors>

Excellent: Sharp print without bleed

Good: Little bleed

Fair: Some feather-like bleed

Failure: Significant bleed with blur outline of characters

<Image Drying Property>

A filter paper was pressed to the printed image under predetermined conditions, and the time until the ink was not transferred to the filter paper was determined. The image drying property was evaluated as Failure when it took 5 minutes or more.

<Scratch Resistance>

Excellent: The cotton cloth is hardly colored.

Good: The cotton cloth is slightly colored.

Fair: The cotton cloth is clearly colored.

Failure: The cotton cloth is thickly colored.

<Image Gloss>

The gloss of the image was determined by visual observation.

Excellent: Excellent

Good: Good

Fair: Somewhat inferior

Failure: Inferior

TABLE 3

| Recording Medium | Ink Set | Ink | Bleed between two colors | Uniformity in solid image | Drying property |
|---|---|---|---|---|---|
| Recording Medium 1 (peak of pore radius distribution curve: 44) | Ink Set 1 | Ink 1 CYAN | Excellent | Excellent | 1 sec> |
| | | Ink 2 MAG | Excellent | Excellent | 1 sec> |
| | | Ink 3 YEL | Excellent | Excellent | 1 sec> |
| | | Ink 4 BK | Excellent | Excellent | 1 sec> |
| Recording Medium 2 (peak of pore radius distribution curve: 19) | Ink Set 1 | Ink 1 CYAN | Excellent | Excellent | 1 sec> |
| | | Ink 2 MAG | Excellent | Excellent | 1 sec> |
| | | Ink 3 YEL | Excellent | Excellent | 1 sec> |
| | | Ink 4 BK | Excellent | Excellent | 1 sec> |
| Recording Medium 2 (peak of pore radius distribution curve: 19) | Ink Set 2 | Ink 5 CYAN | Excellent | Excellent | 1 sec> |
| | | Ink 6 MAG | Excellent | Excellent | 1 sec> |
| | | Ink 7 YEL | Excellent | Excellent | 1 sec> |
| | | Ink 4 BK | Excellent | Excellent | 1 sec> |

TABLE 3-continued

| | Recording Medium | Ink Set | Ink | | | |
|---|---|---|---|---|---|---|
| | Recording Medium 2 (peak of pore radius distribution curve: 19) | Ink Set 3 | Ink 9 CYAN | Excellent | Excellent | 1 sec> |
| | | | Ink 10 MAG | Excellent | Excellent | 1 sec> |
| | | | Ink 11 YEL | Excellent | Excellent | 1 sec> |
| | | | Ink 8 BK (Comparative Example 3) | Excellent | Excellent | 1 sec> |
| | Recording Medium 3 (peak of pore radius distribution curve: 8) | Ink set 2 | Ink 5 CYAN | Excellent | Excellent | 1 sec> |
| | | | Ink 6 MAG | Excellent | Excellent | 1 sec> |
| | | | Ink 7 YEL | Excellent | Excellent | 1 sec> |
| | | | Ink 4 BK | Excellent | Excellent | 1 sec> |
| | Recording Medium 2 (peak of pore radius distribution curve: 19) | Ink set 4 | Ink 12 CYAN | Fair | Fair | 1 sec> |
| | | | Ink 13 MAG | Fair | Fair | 1 sec> |
| | | | Ink 14 YEL | Fair | Fair | 1 sec> |
| | | | Ink 15 BK (Comparative Example 4) | Failure | Failure | 1 sec> |
| | Recording Medium 4 (peak of pore radius distribution curve: 4) | Ink set 2 | Ink 5 CYAN | Excellent | Excellent | 1 sec> |
| | | | Ink 6 MAG | Excellent | Excellent | 1 sec> |
| | | | Ink 7 YEL | Excellent | Excellent | 1 sec> |
| | | | Ink 4 BK | Excellent | Excellent | 1 sec> |
| Comp. Ex. 1 | Recording Medium 5 | Ink set 2 | Ink 5 CYAN | Fair | Failure | Failure |
| | | | Ink 6 MAG | Fair | Failure | Failure |
| | | | Ink 7 YEL | Fair | Failure | Failure |
| | | | Ink 4 BK | Fair | Failure | Failure |

| | Recording Medium | Ink Set | Ink | Scratch resistance | Image density | Image gloss |
|---|---|---|---|---|---|---|
| | Recording Medium 1 (peak of pore radius distribution curve: 44) | Ink Set 1 | Ink 1 CYAN | Excellent | 1.68 | Fair |
| | | | Ink 2 MAG | Excellent | 1.02 | Fair |
| | | | Ink 3 YEL | Excellent | 0.96 | Fair |
| | | | Ink 4 BK | Excellent | 1.53 | Fair |
| | Recording Medium 2 (peak of pore radius distribution curve: 19) | Ink Set 1 | Ink 1 CYAN | Excellent | 1.96 | Good |
| | | | Ink 2 MAG | Excellent | 1.18 | Good |
| | | | Ink 3 YEL | Excellent | 1.04 | Good |
| | | | Ink 4 BK | Excellent | 1.65 | Good |
| | Recording Medium 2 (peak of pore radius distribution curve: 19) | Ink Set 2 | Ink 5 CYAN | Excellent | 2.02 | Good |
| | | | Ink 6 MAG | Excellent | 1.22 | Good |
| | | | Ink 7 YEL | Excellent | 1.06 | Good |
| | | | Ink 4 BK | Excellent | 1.72 | Good |
| | Recording Medium 2 (peak of pore radius distribution curve: 19) | Ink Set 3 | Ink 9 CYAN | Good | 1.95 | Good |
| | | | Ink 10 MAG | Good | 1.20 | Good |
| | | | Ink 11 YEL | Good | 1.04 | Good |
| | | | Ink 8 BK (Comparative Example 3) | Failure | 1.48 | Failure |
| | Recording Medium 3 (peak of pore radius distribution curve: 8) | Ink set 2 | Ink 5 CYAN | Excellent | 2.15 | Excellent |
| | | | Ink 6 MAG | Excellent | 1.30 | Excellent |
| | | | Ink 7 YEL | Excellent | 1.18 | Excellent |
| | | | Ink 4 BK | Excellent | 1.85 | Excellent |
| | Recording Medium 2 (peak of pore radius distribution curve: 19) | Ink set 4 | Ink 12 CYAN | Good | 1.90 | Good |
| | | | Ink 13 MAG | Good | 1.18 | Good |
| | | | Ink 14 YEL | Good | 1.01 | Good |
| | | | Ink 15 BK (Comparative Example 4) | Failure | 1.42 | Failure |
| | Recording Medium 4 (peak of pore radius distribution curve: 4) | Ink set 2 | Ink 5 CYAN | Good | 2.08 | Excellent |
| | | | Ink 6 MAG | Good | 1.25 | Excellent |
| | | | Ink 7 YEL | Good | 1.16 | Excellent |
| | | | Ink 4 BK | Good | 1.76 | Excellent |
| Comp. Ex. 1 | Recording Medium 5 | Ink set 2 | Ink 5 YAN | Failure | 1.70 | Good |
| | | | Ink 6 AG | Failure | 1.03 | Good |
| | | | Ink 7 EL | Failure | 0.96 | Good |
| | | | Ink 4 BK | Failure | 1.62 | Good |

TABLE 4

| Recording Medium | Ink Set | Ink | Bleed between two colors | Uniformity in solid image | Drying property | Scratch resistance |
|---|---|---|---|---|---|---|
| Recording Medium 6 (peak of pore radius distribution curve: 8) | Ink Set 1 | Ink 1 CYAN | Excellent | Excellent | 1 sec> | Good |
| | | Ink 2 MAG | Excellent | Excellent | 1 sec> | Good |
| | | Ink 3 YEL | Excellent | Excellent | 1 sec> | Good |
| | | Ink 4 BK | Excellent | Excellent | 1 sec> | Good |
| Recording Medium 7 (peak of pore radius distribution curve: 3) | Ink Set 1 | Ink 1 CYAN | Excellent | Excellent | 1 sec> | Excellent |
| | | Ink 2 MAG | Excellent | Excellent | 1 sec> | Excellent |
| | | Ink 3 YEL | Excellent | Excellent | 1 sec> | Excellent |
| | | Ink 4 BK | Excellent | Excellent | 1 sec> | Excellent |

TABLE 4-continued

| | Recording Medium | Ink Set | Ink | Bleed between two colors | Uniformity in solid image | Drying property | Scratch resistance |
|---|---|---|---|---|---|---|---|
| | Recording Medium 7 (peak of pore radius distribution curve: 3) | Ink Set 2 | Ink 5 CYAN | Excellent | Excellent | 1 sec> | Excellent |
| | | | Ink 6 MAG | Excellent | Excellent | 1 sec> | Excellent |
| | | | Ink 7 YEL | Excellent | Excellent | 1 sec> | Excellent |
| | | | Ink 4 BK | Excellent | Excellent | 1 sec> | Excellent |
| | Recording Medium 7 (peak of pore radius distribution curve: 3) | Ink Set 3 | Ink 9 YAN | Excellent | Excellent | 1 sec> | Good |
| | | | Ink 10 AG | Excellent | Excellent | 1 sec> | Good |
| | | | Ink 11 EL | Excellent | Excellent | 1 sec> | Good |
| | | | Ink 8 BK (Comp. Ex. 3) | Excellent | Excellent | 1 sec> | Failure |
| | Recording Medium 8 (peak of pore radius distribution curve: 6) | Ink Set 2 | Ink 5 CYAN | Excellent | Excellent | 1 sec> | Excellent |
| | | | Ink 6 MAG | Excellent | Excellent | 1 sec> | Excellent |
| | | | Ink 7 YEL | Excellent | Excellent | 1 sec> | Excellent |
| | | | Ink 4 BK | Excellent | Excellent | 1 sec> | Excellent |
| | Recording Medium 7 (peak of pore radius distribution curve: 3) | Ink Set | Ink 12 CYAN | Fair | Fair | 1 sec> | Good |
| | | | Ink 13 MAG | Fair | Fair | 1 sec> | Good |
| | | | Ink 14 YEL | Fair | Fair | 1 sec> | Good |
| | | | Ink 15 BK (Comp. Ex. 4) | Failure | Failure | 1 sec> | Failure |
| | Recording Medium 10 (peak of pore radius distribution curve: 3) | Ink Set 2 | Ink 5 CYAN | Excellent | Excellent | 1 sec> | Excellent |
| | | | Ink 6 MAG | Excellent | Excellent | 1 sec> | Excellent |
| | | | Ink 7 YEL | Excellent | Excellent | 1 sec> | Excellent |
| | | | Ink 4 BK | Excellent | Excellent | 1 sec> | Excellent |
| Comp. Ex. 2 | Recording Medium 9 | Ink Set 2 | Ink 5 CYAN | Fair | Failure | Failure | Failure |
| | | | Ink 6 MAG | Fair | Failure | Failure | Failure |
| | | | Ink 7 YEL | Fair | Failure | Failure | Failure |
| | | | Ink 4 BK | Fair | Failure | Failure | Failure |

An image was printed on Recording Medium 10 having a porous layer on an optically transparent poly(ethylene terephthalate) film using Ink Set 2. The printed image was projected using an overhead projector (OHP) to find that a projected image was sharp and uniform. This is probably because the porous layer has fine and highly transparent pores, the polymer emulsion in the ink contains particles with a small particle diameter, and the light diffuses at a less ratio, and because the ink is absorbed rapidly to thereby prevent unevenness. Recording Medium 10 had a haze of 6.2% and had a high optical transparency as a recording medium having a porous layer.

REFERENCE EXAMPLE 6

Preparation of Polymer Fine Particle Dispersion Containing Phthalocyanine Pigment A blue polymer fine particle dispersion was prepared according to the procedure of Preparation Example 3 described in JP-A No. 2001-139849.

The polymer fine particles had an average particle diameter (D50%) of 93 nm as detemrined with a Microtrac UPA.

REFERENCE EXAMPLE 7

Preparation of Polymer Fine Particle Dispersion Containing Dimethylquinacridone Pigment A purplish red (magenta) dispersion of polymer fine particles was prepared by the procedure of Reference Example 6, except for using Pigment Red 122 instead of the phthalocyanine pigment. The polymer fine particles had an average particle diameter (D50%) of 127 nm as detemrined with a Microtrac UPA.

REFERENCE EXAMPLE 8

Preparation of Polymer Fine Particle Dispersion Containing Monoazo Yellow Pigment A yellow dispersion of polymer fine particles was prepared by the procedure of Reference Example 6, except for using Pigment Yellow 74 instead of the phthalocyanine pigment. The polymer fine particles had an average particle diameter (D50%) of 76 nm as determined with a Microtrac UPA.

COMPARATIVE REFERENCE EXAMPLE 1

Carbon Black Dispersion 2 Treated with Diazo Compound

In 750 g of water were dispersed 100 g of carbon black having a surface area of 230 m$^2$/g and a DBP oil absorption of 70 ml/100-g and 34 g of p-amino-N-benzoic acid. Then, 16 g of nitric acid was added dropwise thereto and was stirred at 70° C. Five minutes later, a solution of 11 g of sodium nitrite in 50 g of water was added, followed by stirring for further 1 hour. The slurry was diluted 10 folds and was centrifuged to remove coarse particles. After adjusting pH to 8 to 9 with diethanolamine, the dispersion was desalted and concentrated using an ultrafilter and thereby yielded a carbon black dispersion having a pigment concentration of 15%. The dispersion was filtrated through a 0.5-μm polypropylene filter and thereby yielded Carbon Black Dispersion 2 having an average particle diameter (D50%) of 99 nm as determined with a Microtrac UPA.

(Ink 16)

An ink composition having the following formulation was prepared, which pH was adjusted to 9 with a 10% aqueous lithium hydroxide solution. The composition was filtrated through a membrane filter having an average pore diameter of 0.8 μm and thereby yielded a target ink composition.

| | |
|---|---|
| Phthalocyanine pigment-containing polymer fine particles of Reference Example 6 | 8.0% by weight (in terms of solid content) |
| Triethylene glycol | 22.5% by weight |
| Glycerol | 7.5% by weight |
| 2-Pyrrolidone | 5.0% by weight |
| Surfactant of Example (I-1) in Table 1 | 2.0% by weight |
| 2-Ethyl-1,3-hexanediol | 2.0% by weight |
| Proxel LV (antiseptic agent) | 0.2% by weight |
| Ion-exchanged water | balance |

(Ink 17)

An ink composition was prepared by the procedure of Ink 16, except for using the following composition and adjusting pH to 9 with sodium hydroxide.

| | |
|---|---|
| Dimethylquinacridone pigment-containing polymer fine particles of Reference Example 7 | 8.0% by weight (in terms of solid content) |
| Propylene glycol | 30.0% by weight |
| Glycerol | 10.0% by weight |
| N-Methyl-2-pyrrolidone | 2.0% by weight |
| Surfactant of Example (I-2) in Table 1 | 2.0% by weight |
| 2,2,4-Trimethyl-1,3-pentanediol | 2.0% by weight |
| Proxel LV (antiseptic agent) | 0.2% by weight |
| Ion-exchanged water | balance |

(Ink 18)

An ink composition was prepared by the procedure of Ink 16, except for using the following composition and adjusting pH to 9 with lithium hydroxide.

| | |
|---|---|
| Monoazo yellow pigment-containing polymer fine particles of Reference Example 8 | 8.0% by weight (in terms of solid content) |
| 1,3-Butanediol | 22.5% by weight |
| Glycerol | 7.5% by weight |
| 2-Pyrrolidone | 5.0% by weight |
| Surfactant of Example (I-4) in Table 1 | 2.0% by weight |
| 2,2,4-Trimethyl-1,3-pentanediol | 2.0% by weight |
| Proxel LV (antiseptic agent) | 0.2% by weight |
| Ion-exchanged water | balance |

(Comparative Ink 1)

An ink composition was prepared by the procedure of Ink 16, except for using the following composition and adjusting pH to 9 with sodium hydroxide.

| | |
|---|---|
| Carbon Black Dispersion 2 treated with diazo compound of Comparative Reference Example 1 | 4.0% by weight (in terms of pigment solid content) |
| Ethylene glycol | 15.0% by weight |
| Glycerol | 5.0% by weight |
| 2-Pyrrolidone | 2.0% by weight |
| ECTD-6NEX (anionic surfactant, a product of Nikko Chemicals Co., Ltd.) | 1.0% by weight |
| 2,2,4-Trimethyl-1,3-pentanediol | 2.0% by weight |
| Proxel LV (antiseptic agent) | 0.2% by weight |
| Ion-exchanged water | balance |

(Medium 1)

A coating composition for ink-receiving layer having the following composition was prepared, was applied to a resin-coated paper to a dry coating amount of 20 g/m², was dried and thereby yielded Medium Example 1 having a 60-degree gloss of 20 and a Beck smoothness of 747 seconds.

| | |
|---|---|
| Aerosil 380 (gas phase silica, a product of Nippon Aerosil Co., Ltd.) | 100 parts |
| Poly(vinyl alcohol) | 20 parts |
| Boric acid | 4 parts |

(Comparative Medium 2)

Comparative Medium 2 was prepared by applying a coating composition for ink-receiving layer having the following composition to a poly(ethylene terephthalate) (PET) to a dry coating amount of 20 g/m² and drying the applied layer. Comparative Medium 2 had a 60-degree gloss of 85 and a Beck smoothness of 20 seconds.

| | |
|---|---|
| Poly(vinyl alcohol) | 60 parts |
| Polyvinylpyrrolidone | 20 parts |
| Cationic polymer | 10 parts |
| Silica particles (average particle diameter: about 1 μm) | 1 part |

Next, Inks 16 to 18 and Comparative Ink 1 were subjected to the following tests.

1) Sharpness of Image (1) Printing was performed on each of the following paper using an ink-jet printer EM-900 (a product of Seiko Epson Corporation) at a varying driving voltage of head, frequency and pulse width. For yellow, magenta and cyan color pigment inks, a printing pattern with 100% duty was printed. For the black ink containing the black ink of the present invention, characters were printed simultaneously. Single-pass printing was performed at Mj of 35 pl, Vj of 20 m/sec, a frequency of 1 kHz and a recording density of 360 dpi.

A composite K comprising superimposed images formed by Inks 16, 17 and 18 on Medium 1 was visually observed as black. The image area had a gloss of 30 and showed good light resistance and excellent image-fixing properties in a clock test. In contrast, an image formed by the same inks but on Comparative Medium 2 showed deteriorated image-fixing properties in the clock test.

An image formed form the comparative inks on Medium 1 also showed deteriorated image-fixing properties in the clock test.

As is specifically illustrated in detail above, the recording media for use in the ink-jet recording process of the present invention each have one or more porous layers containing inorganic particles on a substrate, have a porous or gap structure of the porous layer of inorganic particles, match the physical properties of the ink and can satisfactorily absorb the ink. Thus, uniform images can be produced with good drying property. The porous layer of inorganic particles has high affinity for the vinyl polymer, polyester polymer or polyurethane polymer for use as the polymer constituting the polymer emulsion in the ink and exhibits sufficient action as a binder of the colorant to thereby achieve excellent scratch resistance of recorded images. When the uppermost porous layer of the recording medium has a pore structure with a peak in a pore radius distribution curve at 20 nm or less, sharp and glossy images with high densities can be produced.

The present invention provides the recording liquid cartridge housing a recording liquid that can produce images with good properties, high reliability and high safety, and the recording apparatus having the cartridge.

Because of interaction between the polyol having 8 to 11 carbon atoms and the surfactant (I), (II), (III), (IV), (V) or (VI), the ink can have a surface tension of 40 mN/m or less, can be rapidly fixed to almost all recording media and has good marker resistance, even when it contains 8% by weight or more of the polymer fine particles in terms of solid content and thereby has a high viscosity of 8.0 mP sec or more. In addition, the ink composition has higher wettability with the head member and thereby shows improved discharge ability of bubbles, improved frequency responsibility and significantly increased discharge stability.

By using at least one wetting agent selected from glycerol, 1,3-butanediol, triethylene glycol, 1,6-hexanediol, propylene glycol, 1,5-pentanediol, diethylene glycol, dipropylene glycol, trimethylolpropane and trimethylolethane, the ink composition of the present invention invites less clogging of nozzles and can produce prints more stably even though it is a highly viscous ink having a high pigment concentration, in contrast to conventional highly viscous inks having a high pigment concentration.

By using at least one wetting agent selected from glycerol, 1,3-butanediol, triethylene glycol, 1,6-hexanediol, propylene glycol, 1,5-pentanediol, diethylene glycol, dipropylene glycol, trimethylolpropane and trimethylolethane, the ink composition of the present invention can be stored significantly stably even though it is a highly viscous ink having a high pigment concentration, in contrast to conventional highly viscous inks having a high pigment concentration.

The ink set of the present invention can produce high-quality images equivalent to those formed by laser printers with substantially no color bleed between black and other colors, by the combination use of the color inks having the above configurations and the black ink containing a self-dispersible carbon black instead of the colorants in the above configurations.

The present invention also provides the recording liquid cartridge housing the recording liquid that can produce images with good penetrating or permeating properties and high reliability and safety, and the recording apparatus having the cartridge.

What is claimed is:

1. An ink-jet recording process comprising the step of applying an ink to the surface of a recording medium according to recording information,
    wherein the recording medium comprises:
    a substrate and
    at least one porous ink-receiving layer arranged on or above the substrate, the ink-receiving layer comprising inorganic particles having a BET specific surface area of 150 m$^2$/g or more; and
    the ink comprises:
    a polymer emulsion containing polymer fine particles having a water-insoluble or hardly-soluble colorant,
    one or more wetting agents,
    one of polyol and glycol ether having 8 to 11 carbon atoms, wherein the one of polyol and glycol ether having 8 to 11 carbon atoms is 2,2,4-trimethyl-1,3-pentanediol,
    one of anionic and nonionic surfactant,
    a water-soluble organic solvent, and
    water,
    wherein the ink has a surface tension of 40 mN/m or less at 25° C., and
    wherein a total amount of the wetting agents contained in the ink is an amount of from 10% by weight to 50% by weight.

2. An ink jet recording process according to claim 1, wherein the ink has a viscosity of 5 mPa·sec or more at 25° C.

3. An ink-jet recording process according to claim 1, wherein an amount of the polymer fine particles in the ink, in terms of solid content, is from 8% by weight to 20% by weight.

4. An ink-jet recording process according to claim 1, wherein the polymer fine particles have an average particle diameter of 0.16 μm or less.

5. An ink-jet recording process according to claim 1, wherein the maximum amount of the ink applied to the recording medium is 40 g/m$^2$ or less, and an image formed by the ink on the recording medium has a 60-degree gloss of 10 to 80.

6. An ink-jet recording process according to claim 1, wherein the wetting agent is selected from the group consisting of glycerol, 1,3-butanediol, triethylene glycol, 1,6-hexanediol, propylene glycol, 1,5-pentanediol, diethylene glycol, dipropylene glycol, trimethylolpropane and trimethylolethane.

7. An ink jet recording process according to claim 1, wherein the polymer constituting the polymer emulsion is one of a vinyl polymer and a polyester polymer.

8. An ink-jet recording process according to claim 1, wherein the weight ratio [(wetting agent)/(solid content in emulsion)] of the wetting agent to the solid content of the polymer fine particles is from 2 to 5.

9. An ink-jet recording process according to claim 1, wherein the ink has a viscosity of 8 mP·sec to 20 mP·sec at 25° C.

10. An ink jet recording process according to claim 1, wherein the inorganic particles have a number-average primary particle diameter of from 1 nm to 30 nm, less than 10% by number of the inorganic particles have a primary particle diameter of less than 1 nm, and less than 5% by number of the inorganic particles have a primary particle diameter of more than 30 nm.

11. An ink-jet recording process according to claim 1, wherein the porous ink-receiving layer further comprises a binder resin for binding the inorganic particles in an amount of from 5% by weight to 50% by weight to the amount of the inorganic particles.

12. An ink-jet recording process according to claim 1, wherein the porous ink-receiving layer has a thickness of 5 μm to 50 μm.

13. An ink-jet recording process according to claim 1, wherein the inorganic particles in the porous ink-receiving layer comprise one of silica and alumina.

14. An ink jet recording process according to claim 1, wherein the recording medium comprises:
    a first porous ink-receiving layer of an alumina hydrate, and
    a second porous ink-receiving layer containing the inorganic particles arranged on or above the first porous ink-receiving layer.

15. An ink-jet recording process according to claim 1, wherein the uppermost porous ink-receiving layer of the recording medium has a peak in a pore radius distribution curve at 20 nm or less.

16. An ink jet recording process according to claim 1, wherein the uppermost porous ink-receiving layer of the recording medium has a Beck smoothness of 300 seconds or more.

17. An ink jet recording process according to claim 1, wherein the step of applying an ink is performed by ejecting the ink and the recording information is a recording signal to thereby produce an image on the recording medium.

18. An ink-jet recording process according to claim 1, further comprising the step of applying heat energy to the ink to thereby discharge the ink.

19. An ink-jet recording process according to claim 1, further comprising the step of applying mechanical energy to the ink to thereby discharge the ink.

20. An ink jet recording process according to claim 1, wherein the ink comprises a plurality of color inks including at least cyan, magenta and yellow color ink, and wherein a full-color image is formed on the recording medium using the ink.

21. An ink-jet recording process according to claim 1, wherein the ink comprises a plurality of color inks including at least cyan, magenta and yellow color ink, and wherein an achromatic image is formed without using a black ink.

22. An ink jet recording process according to one of claims 20 and 21, further comprising the steps of:
   ejecting the plurality of color inks according to a recording signal, and;
   mixing at least part of the color inks on the recording medium, wherein the color inks are applied in increasing order of lightness to form an image in a mixed color portion.

23. A record which is recorded by the ink jet recording process according to claim 1.

24. An ink jet recording process according to claim 1, wherein content of the inorganic particles in the ink receiving layer having a primary particle diameter of less than 1 nm is less than 10% by number in the ink receiving layer of the recording medium and content of the inorganic particles having a particle diameter exceeding 30nm is less than 5% by number in the ink receiving layer of the recording medium.

25. An ink-jet recording apparatus comprising:
   one of an ink container and ink cartridge for housing an ink; and
   a head or recording unit for discharging the ink as droplets, wherein the ink to be housed in the one of ink container and ink cartridge is the ink comprising
      a polymer emulsion containing polymer fine particles having a water-insoluble or hardly-soluble colorant,
      one or more wetting agents,
      one of polyol and glycol ether having 8 to 11 carbon atoms, wherein the one of polyol and glycol ether having 8 to 11 carbon atoms is 2,2,4-trimethyl-1,3-pentanediol,
      one of anionic and nonionic surfactant,
      a water-soluble organic solvent, and
      water,
   wherein the ink has a surface tension of 40 mN/m or less at 25° C., and
   wherein a total amount of the wetting agents contained in the ink is an amount of from 10% by weight to 50% by weight.

26. An ink-recording medium set, comprising:
   a recording medium comprising:
      a substrate and
      at least one porous ink-receiving layer arranged on or above the substrate, the ink-receiving layer comprising inorganic particles having a BET specific surface area of 150 m$^2$/g or more; and
   an ink comprising:
      a polymer emulsion containing polymer fine particles having a water-insoluble or hardly-soluble colorant,
      one or more wetting agents,
      one of polyol and glycol ether having 8 to 11 carbon atoms, wherein the one of polyol and glycol ether having 8 to 11 carbon atoms is 2,2,4-trimethyl-1,3-pentanediol,
      one of anionic and nonionic surfactant,
      a water-soluble organic solvent, and
      water,
   wherein the ink has a surface tension of 40 mN/m or less at 25° C., and
   wherein a total amount of the wetting agents contained in the ink is an amount of from 10% by weight to 50% by weight.

* * * * *